US011732115B2

(12) United States Patent
De Cancellis et al.

(10) Patent No.: US 11,732,115 B2
(45) Date of Patent: Aug. 22, 2023

(54) TIRE FOR VEHICLE WHEELS

(71) Applicant: PIRELLI TYRE S.p.A., Milan (IT)

(72) Inventors: Pierluigi De Cancellis, Milan (IT); Thomas Hanel, Milan (IT); Francesco Parazzoli, Milan (IT); Giuseppina Ratti, Milan (IT); Juergen Wagemann, Milan (IT); Marianna Zinna, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 225 days.

(21) Appl. No.: 16/306,406

(22) PCT Filed: Jun. 6, 2017

(86) PCT No.: PCT/EP2017/063706
§ 371 (c)(1),
(2) Date: Nov. 30, 2018

(87) PCT Pub. No.: WO2017/211823
PCT Pub. Date: Dec. 14, 2017

(65) Prior Publication Data
US 2020/0317891 A1    Oct. 8, 2020

(30) Foreign Application Priority Data

Jun. 7, 2016  (EP) .................................... 16173276

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *B60C 1/0025* (2013.01); *B60C 2001/0058* (2013.01); *C08L 2205/03* (2013.01); *C08L 2207/04* (2013.01)

(58) Field of Classification Search
CPC ............... B60C 1/0016; B60C 1/0025; B60C 2001/0058; C08L 9/06; C08L 2205/03; C08L 2207/04
See application file for complete search history.

(56) References Cited

U.S. PATENT DOCUMENTS

| | | | | |
|---|---|---|---|---|
| 4,748,168 | A * | 5/1988 | Kawakami | B60C 1/0016 524/474 |
| 4,929,679 | A * | 5/1990 | Akita | C08L 7/00 152/905 |
| 5,432,232 | A | 7/1995 | Hattori et al. | |
| 7,096,903 | B2 * | 8/2006 | Weydert | B60C 1/0016 152/209.1 |
| 2007/0238822 | A1 | 10/2007 | Wang et al. | |
| 2011/0294936 | A1 * | 12/2011 | Sato | C08K 3/36 524/315 |
| 2014/0329930 | A1 * | 11/2014 | Sato | B60C 1/00 523/156 |

FOREIGN PATENT DOCUMENTS

| | | |
|---|---|---|
| CN | 101316730 A | 12/2008 |
| CN | 101326238 A | 12/2008 |
| CN | 101563239 A | 10/2009 |
| CN | 102066426 A | 5/2011 |
| CN | 102762598 A | 10/2012 |
| CN | 102933609 A | 2/2013 |
| CN | 102936613 A | 2/2013 |
| CN | 104144929 A | 11/2014 |
| CN | 104203986 | 12/2014 |
| CN | 104487506 A | 4/2015 |
| FR | 2759703 A1 | 8/1998 |
| JP | 4240209 B2 | 12/2004 |
| JP | 2009-287018 A | 12/2009 |
| JP | 2014-105238 A | 6/2014 |
| WO | WO 2009/148932 A1 | 12/2009 |
| WO | WO 2014/040640 A1 | 3/2014 |
| WO | WO 2014040639 A1 | 3/2014 |

OTHER PUBLICATIONS

E. T. McDonel, K. C. Baranwal & J. C. Andries, "Elastomer Blends in Tires," in Polymer Blends, vol. 2, 263-92 (1978).*
G. R. Lappin et al. "Olefins, Higher," in Kirk Othmer Encyclopedia of Chemical Technology, 20 pages, first published 2010.*
Office Action from the Federal Service for Intellectual Property in a counterpart Russian Application No. 2018146489/11, dated Jul. 23, 2020.
Search Report from the Federal Service for Intellectual Property in a counterpart Russian Application No. 2018146489/11, dated Jul. 23, 2020.
International Search Report form the European Patent Office in corresponding International Application No. PCT/EP2017/063706 dated Sep. 13, 2017.

(Continued)

*Primary Examiner* — Angela C Scott
(74) *Attorney, Agent, or Firm* — Finnegan, Henderson, Farabow, Garrett & Dunner, L.L.P.

(57) ABSTRACT

The present invention relates to a tire (100) for vehicle wheels comprising a tire component comprising a cross-linked elastomeric material obtained by crosslinking a cross-linkable elastomeric composition, wherein said elastomeric composition comprises a polymer blend comprising (a) 50 to 95 percent by weight of a first elastomeric polymer and (b) 5 to 50 percent by weight of a second elastomeric polymer based on the total weight of the polymer blend. The second elastomeric polymer (b) is obtainable by (i) anionic polymerization of at least one conjugated diene monomer and one or more a-olefin monomer(s) in the presence of a polymerization initiator in an organic solvent, and (ii) coupling the polymer chains obtained in (i) by a coupling agent. The second elastomeric polymer (b) has a weight-average molecular weight (Mw) in the range of 5,000-40,000 g/mol and a coupling rate of at least 50 percent by weight.

22 Claims, 1 Drawing Sheet

(56) References Cited

OTHER PUBLICATIONS

Written Opinion of the International Searching Authority from the European Patent Office in corresponding International Application No. PCT/EP2017/063706 dated Sep. 13, 2017.
Notification of the First Office Action dated Jun. 16, 2020, from China National Intellectual Property Administration, in counterpart Chinese Application No. 201780033585.9.

* cited by examiner

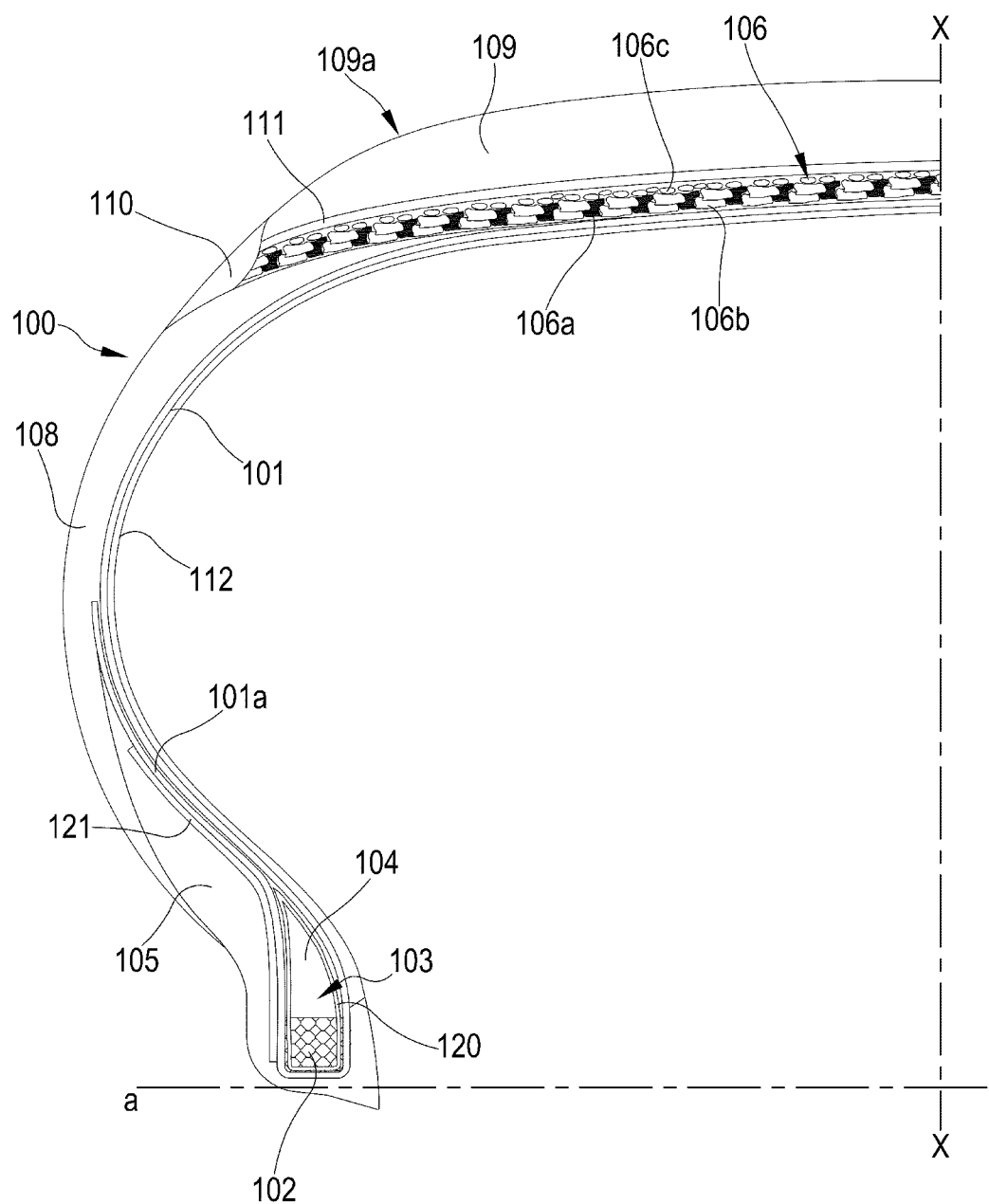

TIRE FOR VEHICLE WHEELS

This application is a national stage entry application under 35 U.S.C. § 371 based on International Application No. PCT/EP2017/063706, filed Jun. 6, 2017, and claims priority to European Patent Application No. 16173276.3, filed Jun. 7, 2016; the contents of each application is incorporated herein by reference.

TECHNICAL FIELD

The present invention relates to a tire for vehicle wheels, in particular cars.

In particular, the present invention relates to a tire, preferably but not exclusively, a winter tire, comprising a tire component comprising a crosslinked elastomeric material obtained by crosslinking a crosslinkable elastomeric composition comprising a polymer blend comprising:
(a) 50 to 95 percent by weight of a high molecular weight first elastomeric polymer; and
(b) 5 to 50 percent by weight of a second low molecular weight elastomeric polymer.

BACKGROUND ART

U.S. Pat. No. 5,432,232 discloses a rubber composition for use in a tread band of a high running-performance pneumatic tire and, more particularly, a rubber composition for use in a tread band of a high running-performance pneumatic tire.

According to this reference, the disclosed tire achieves good wear resistance and fracture properties and excellent wet skid property, ice skid property and dry gripping property by including a low molecular weight butadiene polymer as a rubber ingredient.

According to this reference, such a rubber composition includes at least 30% by weight of a rubber ingredient which consists of 100 parts by weight of a particular branched styrene-butadiene copolymer (A) and 15-100 parts by weight of a particular low molecular weight butadiene polymer (B) and has a Mooney viscosity of 30-100.

SUMMARY OF THE INVENTION

This summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In the field of tires, car manufacturers are requiring ever higher performances both on dry and wet ground, with an increase in road grip at low temperature, without unbalancing the overall properties.

Indeed, ideal tires which are equally high-performing on all types of ground surface and in all atmospheric and temperature conditions would be desirable. This result is very difficult to achieve, particularly in the field of winter tires.

As a matter of fact, traction and braking at low temperatures are actually in conflict with the behaviour on dry or wet surfaces, and succeeding in obtaining a winter tire characterised by all these properties simultaneously is a particularly challenging aim.

Possible modifications which can be provided in the compositions, such as increasing the content of the filler or varying the amount of conventional plasticisers such as mineral oils or else using plasticising mixtures having a different glass transition temperature $T_g$, have been found to be not fully satisfactory per se.

The Applicant has set itself the problem of how to achieve a better balance of the tire performances on wet and snow ground, particularly of winter tires, and at the same time achieve an equal or better performance in terms of braking on dry surfaces.

The Applicant has surprisingly found that by providing the tire with a tire component comprising a crosslinked elastomeric material obtained by crosslinking a crosslinkable elastomeric composition comprising specific amounts of a low molecular weight elastomeric polymer having a coupled or branched structure as defined hereinbelow, a better balance of wet and ice grip performance of the tire, especially of winter tires, may be achieved.

This elastomeric polymer having a low molecular weight and a coupled or branched structure corresponds to the second elastomeric polymer as referred to in the following and in the claims.

Accordingly, the present invention relates to a tire for vehicles as defined in attached claim 1.

More particularly, the present invention relates to a tire for vehicles comprising a tire component comprising a crosslinked elastomeric material obtained by crosslinking a crosslinkable elastomeric composition, wherein said elastomeric composition comprises a polymer blend comprising:
(a) 50 to 95 percent by weight of a first elastomeric polymer; and
(b) 5 to 50 percent by weight of a second elastomeric polymer;
wherein the first elastomeric polymer (a) is obtainable by:
(I) anionic polymerization of at least one conjugated diene monomer and one or more α-olefin monomer(s) in the presence of a polymerization initiator in an organic solvent and (II) optionally coupling of the polymer chains obtained in (I) by a coupling agent;
wherein the second elastomeric polymer (b) is obtainable by:
(i) anionic polymerization of at least one conjugated diene monomer and one or more α-olefin monomer(s) in the presence of a polymerization initiator in an organic solvent, and (ii) coupling the polymer chains obtained in (i) by a coupling agent;
wherein the first elastomeric polymer (a) has a weight-average molecular weight (Mw) of 300,000 to 4,000,000 g/mol;
wherein the second elastomeric polymer (b) has a weight-average molecular weight (Mw) in the range of 5,000-40,000 g/mol;
wherein a coupling rate of the second elastomeric polymer (b) is at least 50 percent by weight; and
wherein the amounts of the components (a) and (b) are based on the total weight of the polymer blend.

Without wishing to be bound by any particular theory, the Applicant surprisingly observed that by providing the tire with a tire component comprising a crosslinked elastomeric material obtained by crosslinking a crosslinkable elastomeric composition comprising a polymer blend including, in combination:
a specific amount between 50 and 95 percent by weight of a high molecular weight first elastomeric polymer (a) having a weight-average molecular weight (Mw) of 300,000 to 4,000,000 g/mol; and
a specific amount between 5 and 50 percent by weight of a second low molecular weight elastomeric polymer having a weight-average molecular weight (Mw) in the specific range of between 5,000 and 40,000 g/mol; the low molecular weight elastomeric polymer also having a specific high coupling rate of at least 50 percent by weight; a better balance of the tire performances on wet and snow ground and an equal or better performance in terms of braking on dry surfaces was achieved, especially in the case of winter tires.

DETAILED DESCRIPTION OF THE INVENTION

General Definitions

Within the framework of the present description and of the following claims, the term "phr" (parts per hundred of rubber) indicates the parts by weight of a particular component per 100 parts by weight of the elastomeric polymer base.

Unless stated otherwise, all percentages are expressed as percentages by weight.

Within the framework of the present description and of the following claims, the term "coupling rate" indicates the portion of coupled polymer expressed in percent by weight and determined by GPC.

Within the framework of the present description and of the following claims, it is to be understood that the term "coupling" may not be interchanged with "modification" or "functionalization". The latter refers to a chain end modification reaction between one single polymer chain end and one or more modification agent(s) which does not result in branching of the polymer.

In contrast, "coupling" or "branching" corresponds to a chain end reaction between two (coupling) and, respectively, more than two (branching) single polymer chain ends and one or more coupling agent(s).

Coupling between more than two single polymer chain ends and one coupling agent results in branched polymer macromolecules or formation of star shaped polymer macromolecules. Chain end modification reaction between more than two single polymer chain ends and one coupling agent results in polymer macromolecules comprising three or more arms at the coupling point.

For instance, up to four living polymer chain ends may react with $SnCl_4$ as coupling agent, thereby coupling the polymer chains together. The obtained polymer may have a maximum of four arms.

For the purposes of the present description and of the claims that follow, all numbers expressing amounts, quantities, percentages, and so forth, are to be understood as being preceded in all instances by the term "about" except where otherwise indicated. Also, all ranges of numerical entities include all the possible combinations of the maximum and minimum numerical values and all the possible intermediate ranges therein, in addition to those specifically indicated hereinbelow.

The verbs "to comprise" and "to include" are used in this document as open limitations that neither exclude nor require the existence of un-recited features.

The preferred features disclosed in the present description and/or recited in depending claims are freely combinable unless otherwise explicitly stated.

Furthermore, it is to be understood that the use of "a" or "an", i.e. a singular form, throughout this document does not exclude a plural form.

The term "consisting essentially of" has the meaning that specific further components may be present, namely those not materially affecting the essential characteristics of the polymer blend or elastomeric composition in question.

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, etc.; branched alkyl groups, such as isopropyl, tert-butyl (tBu), etc.; and cyclic alkyl groups, such as cyclohexyl.

Alkoxy groups as defined herein include methoxy (MeO), ethoxy (EtO), propoxy (PrO), butoxy (BuO), isopropoxy, isobutoxy, pentoxy, and the like.

Aryl groups, as defined herein, include phenyl, and biphenyl compounds. Aryl groups preferably contain only one aromatic ring and most preferably contain a $C_6$ aromatic ring, i.e. benzene.

Alkylaryl groups, as defined herein, refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

A copolymer, as defined herein, may comprise a minor amount of a third monomer, such as e.g. divinylbenzene, in the range of up to 1 percent by weight, based on the total weight of the polymer.

A random (or statistical) polymer, as defined herein, includes two or more types of monomers which are polymerized in a non-regular or non-consistent way, i.e. the sequence of monomers within the polymer chain follows a statistical rule.

A block copolymer, as defined herein, consists essentially of two types of monomers which are polymerized in a regular or consistent way, thereby forming two or more homopolymer subunits which are linked by covalent bonds.

Detailed Description of Preferred Embodiments of the Invention

The tire according to the invention and the crosslinkable elastomeric composition used to prepare one or more components of the tire can have one or more of the following preferred features, taken in isolation or in any desired combination with one another.

In a preferred embodiment, the polymer blend comprises 10 to 50, more preferably 15 to 25 percent by weight, of the second elastomeric polymer (b) based on the total weight of the polymer blend.

The Applicant observed that in this latter case best results were achieved in terms of a better balance of the tire performances on wet and snow ground and an equal or better performance in terms of braking on dry surfaces, especially in winter tire applications.

In a preferred embodiment, the second elastomeric polymer (b) has a weight-average molecular weight (Mw) in the range of 8,000-30,000 g/mol, more preferably 10,000-20,000 g/mol.

The Applicant observed that also in this case best results were achieved in terms of a better balance of the tire performances on wet and snow ground and an equal or better performance in terms of braking on dry surfaces, especially in winter tire applications.

In a preferred embodiment, the aforementioned polymer blend may further comprise (c) 0 to 13 percent by weight of one or more extender oil(s).

The latter are also known in the art with the term of "softeners" and will be described in more detail hereinbelow.

In a preferred embodiment, the polymer chain ends of the first elastomeric polymer (a) obtained in (I) may be modified by addition and reaction of at least one compound represented by any of formula (1), or formula (12) as better illustrated hereinbelow in the "Modification reaction" section of the present specification.

In a preferred embodiment, the polymer chain ends of the first elastomeric polymer (a) obtained in (I) and/or the polymer chain ends of the second elastomeric polymer (b) obtained in (i) may be modified by addition and reaction of at least one compound represented by any of formula (2), as better illustrated hereinbelow in the "Modification reaction" section of the present specification.

Preferably, the coupling agent may be at least one compound represented by any of formula (16), formula (II) or formula (III), as better illustrated hereinbelow in the "Coupling reaction" section of the present specification. Particularly preferred are $SiCl_4$, $Si(OCH_3)_4$ or $SnCl_4$.

In a preferred embodiment, the polymerization initiator used in (I) may be selected from n-BuLi, sec-BuLi, tert-BuLi, Li—$(CH_2)(Me)_2Si$—N—$(C_4H_9)_2$, Li—$(CH_2)(Me)_2Si$—N—$(C_2H_5)_2$, preferably from the group consisting of the above compounds.

Most preferably, the polymerization initiator used in (i) may be selected from n-BuLi, sec-BuLi, or tert-BuLi, preferably from the group consisting of the above compounds.

In a preferred embodiment, the polymerization initiator used in (I) may further be a compound represented by formula (6) or formula (7), or a Lewis base adduct thereof, and/or a mixture thereof, as better illustrated hereinbelow in the "Anionic polymerization" section of the present specification.

In a preferred embodiment, the conjugated diene monomer contains from 4 to 12, more preferably from 4 to 8 carbon atoms and, more preferably, may be selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 3-butyl-1,3-octadiene, 2-methyl-2,4-pentadiene, cyclopentadiene, 2,4-hexadiene, 2-phenyl-1,3-butadiene, 1,3-cyclooctadiene, or mixtures thereof.

Most preferably, the conjugated diene monomer is 1,3-butadiene, and/or 2-methyl-1,3-butadiene.

In a preferred embodiment, the α-olefin monomer contains from 8 to 20, preferably from 8 to 12 carbon atoms and, more preferably, may be selected from styrene, 1-vinylnaphthene, 2-vinylnaphthene, alkyl, cycloalkyl, aryl, alkyl or arylalkyl derivatives of styrene, such as α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, 2,4-dimethylstyrene, 2,4,6-trimethylstyrene, α-methylstyrene, stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl)aminostyrene, tert-butoxystyrene, vinylpyridine, divinylbenzene, or mixtures thereof.

Most preferably, the α-olefin monomer is styrene, α-methylstyrene, and/or divinylbenzene.

In a preferred embodiment, the first elastomeric polymer (a) may be an optionally coupled and optionally modified styrene-butadiene-copolymer.

In a preferred embodiment, the second elastomeric polymer (b) is a coupled and, optionally modified, styrene-butadiene-copolymer.

In a preferred embodiment, the coupling rate of the second elastomeric polymer (b) is higher than 60 percent by weight Preferably the coupling rate of the second elastomeric polymer (b) is lower than 98 percent by weight.

The Applicant observed that in this case best results were achieved in terms of a better balance of the tire performances on wet and snow ground and an equal or better performance in terms of braking on dry surfaces, especially in winter tire applications.

In a preferred embodiment, the degree of branching of the second elastomeric polymer (b) is more than 2.

In a preferred embodiment, the first elastomeric polymer (a) and/or the second elastomeric polymer (b) is a random polymer.

In this way, best results in terms of a better balance of wet and ice grip performance of the tire, especially of winter tires, were observed.

According to this preferred embodiment, the anionic polymerization (I) and/or (i) is performed in the presence of at least one randomizer, such as ditetrahydrofuyl-propane (DTHFP) and tetramethylene-ethylene-diamine (TMEDA).

In (I), the molar ratio of randomizer, such as DTHFP, to active polymerization initiator is from 1 to 1.5 mol/mol.

In (i), the molar ratio of randomizer, such as DTHFP, to active polymerization initiator is from 0.1 to 1 mol/mol.

The Polymer Blend

The polymer blend used in the elastomeric composition employed to prepare the tire component of the tire according to the invention, comprises, or consists essentially of, or consists of, a first elastomeric polymer having a high molecular weight (herein also referred to as "component (a)"), a second elastomeric polymer having a low molecular weight (herein also referred to as "component (b)") and, optionally, a (conventional) extender oil having a low molecular weight (herein also referred to as "component (c)").

Component (a)—the High Molecular Weight Elastomeric Polymer

As mentioned above, component (a) is preferably a random polymer and is obtainable by (I) anionic polymerization of at least one conjugated diene monomer and one or more α-olefin monomer(s) in the presence of a polymerization initiator in an organic solvent.

Further, the polymer chains obtained in (I) may optionally be coupled (or branched) by coupling (II) by means of a coupling agent as defined below.

Optionally, the polymer chains obtained in (I) or (II), if applicable, may be modified by a modification agent as defined below.

Specific monomer(s) and suitable conditions for the anionic polymerization reaction and the coupling reaction/modification reaction, if applicable, are described below in more detail.

Further to the following specific disclosure, generally applicable polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer), suitable amounts of the reagents, suitable monomer(s), and suitable process conditions are described in WO 2009/148932, which is entirely incorporated herein by reference.

Anionic Polymerization

Preferred examples of representative conjugated diene monomers may include, but are not limited to, 1,3-butadiene, 2-alkyl-1,3-butadiene, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and combinations thereof. Preferred are 1,3-butadiene, isoprene, and combinations thereof.

Preferred examples of suitable α-olefin monomers may include, but are not limited to, styrene and its derivatives, including, without limitation, $C_{1-4}$ alkyl substituted styrenes, such as 2-methylstyrene, 3-methylstyrene, α-methylstyrene, 2,4-dimethylstyrene, 2,4,6-trimethylstyrene, and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl) aminostyrene, tert-butoxystyrene, vinylpyridine, divinylbenzene, including 1,2-divinylbenzene, 1,3-divinylbenzene and 1,4-divinylbenzene, and/or mixtures thereof.

Most preferably, styrene, α-methylstyrene, and/or divinylbenzene, including 1,2-divinylbenzene, 1,3-divinylbenzene and 1,4-divinylbenzene, are used as the at least one α-olefin monomer, as defined in claim 1.

Preferably, the polymerization of the monomers, i.e. the at least one conjugated diene monomer and the one or more α-olefin monomer(s), as described above, may be carried out at a temperature above 0° C.

In a preferred embodiment, the temperature of the polymerization is in the range of 20° C.-110° C., more preferably in the range of 30° C.-95° C.

An organic solvent may be suitably used for the polymerization reaction.

In a preferred embodiment, the polymerization solvent is selected from non-polar aromatic and non-aromatic solvents including, without limitation, butane, butene, pentane, cyclohexane, toluene, hexane, heptane and octane. In a preferred embodiment, the solvent is selected from butane, butene, cyclohexane, hexane, heptane, toluene or mixtures thereof.

Preferably, the solid content of the monomers to be polymerized may be from 5 to 35 percent by weight, more preferably from 10 to 30 percent by weight, and most preferably from 15 to 25 percent by weight, based on the total weight of monomers and solvent.

The term "total solid content of monomers" (herein abbreviated as TSC), "solid content of monomers", or similar terms, as used herein, refers to the total mass (or weight) percentage of monomers, based on the total weight of solvent and monomers (e.g. 1,3-butadiene and styrene).

In a preferred embodiment, the polymerization initiator is suitably an alkyl lithium compound, such as ethyl lithium, propyl lithium, n-butyl lithium, sec-butyl lithium, tert-butyl lithium, phenyl lithium, hexyl lithium, 1,4-dilithio-n-butane, a compound represented by the following formula (6) or formula (7), or Lewis base adducts thereof. Mixtures of these polymerization initiators may also be employed.

formula (6)

wherein $R^{3a}$ is independently selected from $-N(R^{28})R^{29}$, $C_1$-$C_{18}$ alkyl, $C_6$-$C_{18}$ aryl and ($C_7$-$C_{18}$) aralkyl; $R^{4a}$ is independently selected from $-N(R^{30a})R^{31a}$, ($C_1$-$C_{18}$) alkyl, ($C_6$-$C_{18}$) aryl and ($C_7$-$C_{18}$) aralkyl; $R^5$ and $R^6$ are each independently selected from hydrogen, $C_1$-$C_{18}$ alkyl, $C_6$-$C_{18}$ aryl and $C_7$-$C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently selected from hydrogen, $C_1$-$C_{18}$ alkyl, $C_6$-$C_{18}$ aryl and $C_7$-$C_{18}$ aralkyl; $R^{26}$, $R^{27}$, $R^{28}$, $R^{29}$, $R^{30a}$ and $R^{31a}$ are each independently selected from $C_1$-$C_{18}$ alkyl, $C_6$-$C_{18}$ aryl and $C_7$-$C_{18}$ aralkyl; q is selected from an integer of 1, 2, 3, 4 and 5; and r is selected from an integer of 1, 2 and 3; and $a_{1'}$ is selected from an integer of 0 or 1.

In a preferred embodiment, $R^{3a}$, $R^{4a}$, $R^{22}$, $R^{23}$, $R^{24}$, $R^{25}$, $R^{26}$ and $R^{27}$ are each independently selected from ($C_1$-$C_{18}$) alkyl; $R^5$, $R^6$, $R^{18}$, $R^{19}$, $R^{20}$ and $R^{21}$ are each independently selected from hydrogen and ($C_1$-$C_{18}$) alkyl; and $R^{12}$, $R^{13}$, $R^{14}$, $R^{15}$, $R^{16}$ and $R^{17}$ are each independently selected from hydrogen and ($C_1$-$C_6$) alkyl; and the remaining groups and parameters are defined as in formula (6) and formula (7) above.

Useful amino silane polymerization initiators of formula (6) and (7) include the following:

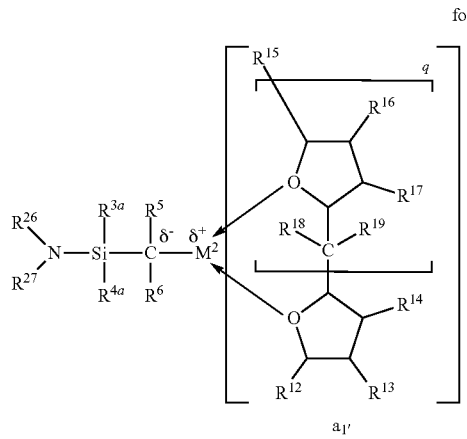

-continued

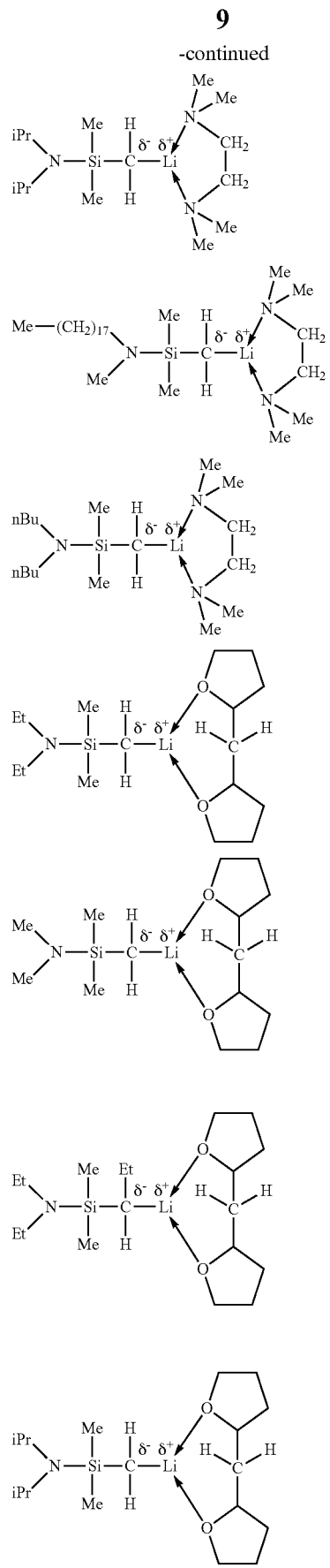

-continued

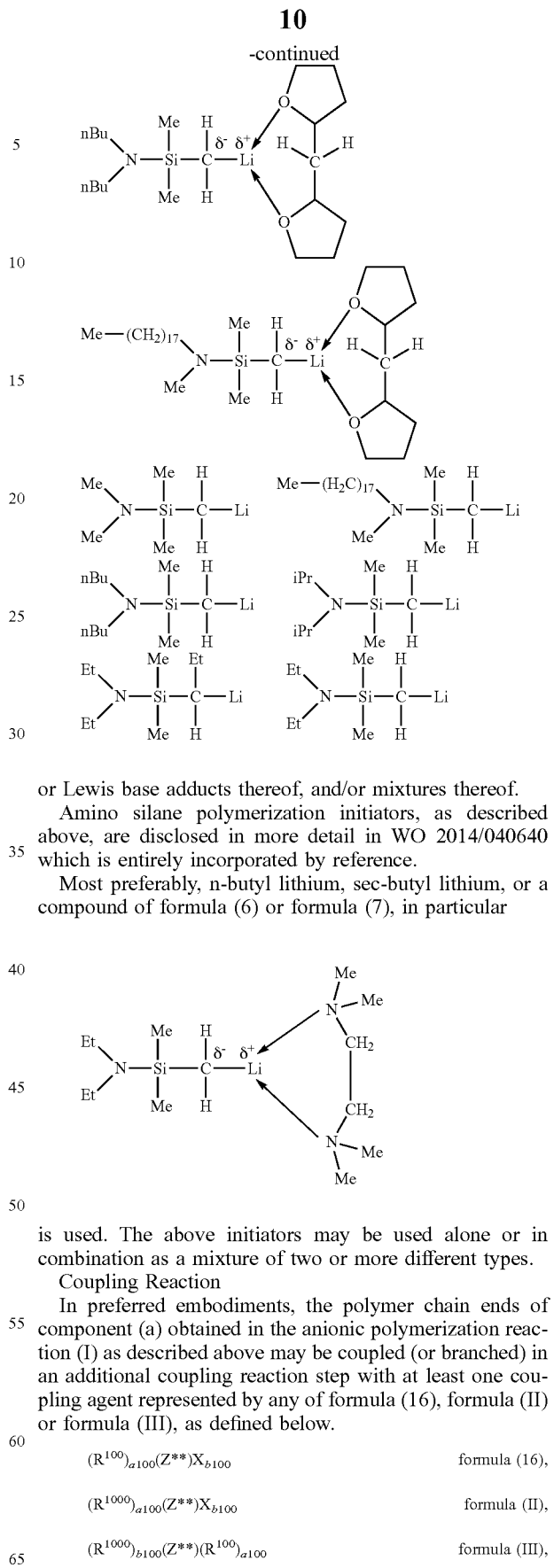

or Lewis base adducts thereof, and/or mixtures thereof.

Amino silane polymerization initiators, as described above, are disclosed in more detail in WO 2014/040640 which is entirely incorporated by reference.

Most preferably, n-butyl lithium, sec-butyl lithium, or a compound of formula (6) or formula (7), in particular is used. The above initiators may be used alone or in combination as a mixture of two or more different types.

Coupling Reaction

In preferred embodiments, the polymer chain ends of component (a) obtained in the anionic polymerization reaction (I) as described above may be coupled (or branched) in an additional coupling reaction step with at least one coupling agent represented by any of formula (16), formula (II) or formula (III), as defined below.

$(R^{100})_{a100}(Z^{})X_{b100}$  formula (16), $(R^{1000})_{a100}(Z^{})X_{b100}$  formula (II), $(R^{1000})_{b100}(Z^{})(R^{100})_{a100}$  formula (III), wherein $Z^{}$ is tin or silicon; $X_{b100}$ is independently selected from chlorine, bromine and iodine; $R^{100}$ is independently selected from (C$_1$-C$_{20}$) alkyl, (C$_3$-C$_{20}$) cycloalkyl, (C$_6$-C$_{16}$) aryl and (C$_7$-C$_{16}$) aralkyl, preferably from the group consisting of the above substituents; a100 is independently an integer from 0 to 1 and b100 is independently an integer from 3 to 4, provided that a+b=4.

Preferred examples of coupling agents may include, without limitation, SiCl$_4$, Si(OCH$_3$)$_4$ and SnCl$_4$.

In the coupling step, one or more coupling agents of formula (16), formula (II) and/or formula (III), as defined above, may be added to the living polymer in an amount such that the molar ratio is of from 0.05 to 0.7, preferably of from 0.07 to 0.4, more preferably of from 0.09 to 0.3.

These coupling agent(s) may be preferably added at almost complete or complete conversion of the monomer(s) to be polymerized, preferably at a conversion rate of the anionic polymerization of higher than 85 percent by weight, based on the amount of monomers provided.

The phrase "amount of monomers provided", "charged amount of monomers", or similar terms, as used herein, refer to the amount of monomers provided in the polymerization step.

In a preferred embodiment, the conversion rate is at least 92.0 percent by weight, preferably higher than 94.0 percent by weight, based on the amount of monomers provided.

The term "monomer conversion", as used herein, refers to the monomer conversion (for example the sum conversion of styrene and 1,3-butadiene) determined, e.g. at the outlet of a given polymerization reactor.

Preferably, a substantial amount of the living polymer chain ends is not terminated prior to the reaction with the modification compound, i.e. the living polymer chain ends are present and capable of reacting with the coupling agent in a polymer chain end modification reaction.

In the course of the modification reaction, one or more polymer chain(s) may react with the coupling agent, thereby coupling or branching the polymer chains.

Accordingly, the coupling reaction, as described above, results in coupled or branched first elastomeric polymers.

In one embodiment, these elastomeric polymers have a degree of branching (=number of polymer arms/chains at the coupling point) of at least 2, such as 2 or 3 or 4.

The obtained degree of branching depends on the type of coupling agent used. For instance, SnCl$_4$ as coupling agents will allow for a degree of branching of up to 4, whereas SnCH$_3$Cl$_3$ will allow for a degree of branching of up to 3, etc.

The coupling rate of the first elastomeric polymer is higher than 20% by weight and lower than 75% by weight, preferably 25-60% by weight.

The coupling agent may be directly added to the polymer solution without dilution. However, it may be beneficial to add the coupling agent in solution using an inert solvent, e.g. a solvent, as described above.

The first elastomeric polymer comprises 50% or more, preferably 40% or more of polymer macromolecules, which are formed through coupling of three or more polymer chain ends at the selected coupling agent(s).

Compounds of formula (2) (see below) may act as coupling agent as well, provided two or more R$_{1O}$ groups react with living polymer chain ends.

Modification Reaction

In preferred embodiments, the polymer chain ends of component (a) obtained in the anionic polymerization reaction (I) as described above may be modified in an additional modification (or functionalization) reaction step with at least one compound of formula (1), formula (2) and/or formula (12), as defined below.

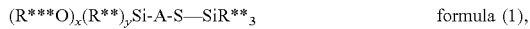
                (R\*\*\*O)$_x$(R\*\*)$_y$Si-A-S—SiR\*\*$_3$        formula (1), wherein each of R is independently selected from C$_1$-C$_{16}$ alkyl or alkylaryl; R* is independently selected from C$_1$-C$_4$ alkyl; A is selected from C$_6$-C$_{18}$ aryl, C$_7$-C$_{50}$ alkylaryl, C$_1$-C$_{50}$ alkyl and C$_2$-C$_{50}$ dialkylether; and optionally R, R*, or A may independently be substituted with one or more groups, selected from C$_1$-C$_4$ alkyl, C$_1$-C$_4$ alkoxy, C$_6$-C$_{12}$ aryl, C$_7$-C$_{16}$ alkylaryl, di(C$_1$-C$_7$ hydrocarbyl)amino, bis(tri(C$_1$-C$_{12}$ alkyl)silyl)amino, tris(C$_1$-C$_7$ hydrocarbyl)silyl and C$_1$-C$_{12}$ thioalkyl; x is an integer selected from 1, 2 and 3; y is an integer selected from 0, 1 and 2; provided that x+y=3, More preferably, each of R* are independently selected from methyl, ethyl, iso-propyl, n-propyl, n-butyl, iso-butyl, or tert-butyl; each of R are independently selected from C$_1$-C$_6$ alkyl, C$_6$-C$_{12}$ aryl, or C$_7$-C$_{10}$ aralkyl; and A is —(CH$_2$)$_N$— wherein N is an integer selected from 1, 2, 3, 4, 5 or 6.

Preferred examples of compounds represented by formula (1) as modification agent(s) may include, without limitation, (MeO)$_3$Si—(CH$_2$)$_3$—S—SiMe$_3$, (EtO)$_3$Si—(CH$_2$)$_3$—S—SiMe$_3$, (PrO)$_3$Si—(CH$_2$)$_3$—S—SiMe$_3$, (BuO)$_3$Si—(CH$_2$)$_3$—S—SiMe$_3$, (MeO)$_3$Si—(CH$_2$)$_2$—S—SiMe$_3$, (EtO)$_3$Si—(CH$_2$)$_2$—S—SiMe$_3$, (PrO)$_3$Si—(CH$_2$)$_2$—S—SiMe$_3$, (BuO)$_3$Si—(CH$_2$)$_2$—S—SiMe$_3$, (MeO)$_3$Si—CH$_2$—S—SiMe$_3$, (EtO)$_3$Si—CH$_2$—S—SiMe$_3$, (PrO)$_3$Si—CH$_2$—S—SiMe$_3$, (BuO)$_3$Si—CH$_2$—S—SiMe$_3$, (MeO)$_3$Si—CH$_2$—CMe$_2$-CH$_2$—S—SiMe$_3$, (EtO)$_3$Si—CH$_2$—CMe$_2$-CH$_2$—S—SiMe$_3$, (PrO)$_3$Si—CH$_2$—CMe$_2$-CH$_2$—S—SiMe$_3$, (BuO)$_3$Si—CH$_2$—CMe$_2$-CH$_2$—S—SiMe$_3$, (MeO)$_3$Si—CH$_2$—C(H)Me-CH$_2$—S—SiMe$_3$, (EtO)$_3$Si—CH$_2$—C(H)Me-CH$_2$—S—SiMe$_3$, (PrO)$_3$Si—CH$_2$—C(H)Me-CH$_2$—S—SiMe$_3$, (BuO)$_3$Si—CH$_2$—C(H)Me-CH$_2$—S—SiMe$_3$, (MeO)$_3$Si—(CH$_2$)$_3$—S-SiEt$_3$, (EtO)$_3$Si—(CH$_2$)$_3$—S-SiEt$_3$, (PrO)$_3$Si—(CH$_2$)$_3$—S-SiEt$_3$, (BuO)$_3$Si—(CH$_2$)$_3$—S-SiEt$_3$, (MeO)$_3$Si—(CH$_2$)$_2$—S-SiEt$_3$, (EtO)$_3$Si—(CH$_2$)$_2$—S-SiEt$_3$, (PrO)$_3$Si—(CH$_2$)$_2$—S-SiEt$_3$, (BuO)$_3$Si—(CH$_2$)$_2$—S-SiEt$_3$, (MeO)$_3$Si—CH$_2$—S-SiEt$_3$, (EtO)$_3$Si—CH$_2$—S-SiEt$_3$, (PrO)$_3$Si—CH$_2$—S-SiEt$_3$, (BuO)$_3$Si—CH$_2$—S-SiEt$_3$, (MeO)$_3$Si—CH$_2$—CMe$_2$-CH$_2$—S-SiEt$_3$, (EtO)$_3$Si—CH$_2$—CMe$_2$-CH$_2$—S-SiEt$_3$, (PrO)$_3$Si—CH$_2$—CMe$_2$-CH$_2$—S-SiEt$_3$, (BuO)$_3$Si—CH$_2$—CMe$_2$-CH$_2$—S-SiEt$_3$, (MeO)$_3$Si—CH$_2$—C(H)Me-CH$_2$—S-SiEt$_3$, (EtO)$_3$Si—CH$_2$—C(H)Me-CH$_2$—S-SiEt$_3$, (PrO)$_3$Si—CH$_2$—C(H)Me-CH$_2$—S-SiEt$_3$, (BuO)$_3$Si—CH$_2$—C(H)Me-CH$_2$—S-SiEt$_3$, (MeO)$_3$Si—(CH$_2$)$_3$—S—SiMe$_2$tBu, (EtO)$_3$Si—(CH$_2$)$_3$—S—SiMe$_2$tBu, (PrO)$_3$Si—(CH$_2$)$_3$—S—SiMe$_2$tBu, (BuO)$_3$Si—(CH$_2$)$_3$—S—SiMe$_2$tBu, (MeO)$_3$Si—(CH$_2$)$_2$—S—SiMe$_2$tBu, (EtO)$_3$Si—(CH$_2$)$_2$—S—SiMe$_2$tBu, (PrO)$_3$Si—(CH$_2$)$_2$—S—SiMe$_2$tBu, (BuO)$_3$Si—(CH$_2$)$_2$—S—SiMe$_2$tBu, (MeO)$_3$Si—CH$_2$—S—SiMe$_2$tBu, (EtO)$_3$Si—CH$_2$—S—SiMe$_2$tBu, (PrO)$_3$Si—CH$_2$—S—SiMe$_2$tBu, (BuO)$_3$Si—CH$_2$—S—SiMe$_2$tBu, (MeO)$_3$Si—CH$_2$—CMe$_2$-CH$_2$—S—SiMe$_2$tBu, (EtO)$_3$Si—CH$_2$—CMe$_2$-CH$_2$—S—SiMe$_2$tBu, (PrO)$_3$Si—CH$_2$—CMe$_2$-CH$_2$—S—SiMe$_2$tBu, (BuO)$_3$Si—CH$_2$—CMe$_2$-CH$_2$—S—SiMe$_2$tBu, (MeO)$_3$Si—CH$_2$—C(H)Me-CH$_2$—S—SiMe$_2$tBu, (EtO)$_3$Si—CH$_2$—C(H)Me-CH$_2$—S—SiMe$_2$tBu, (PrO)$_3$Si—CH$_2$—C(H)Me-CH$_2$—S—SiMe$_2$tBu, (BuO)$_3$Si—CH$_2$—C(H)Me-CH$_2$—S—SiMe$_2$tBu, (MeO)$_2$MeSi—(CH$_2$)$_3$—S—SiMe$_3$, (EtO)$_2$MeSi—(CH$_2$)$_3$—S—SiMe$_3$, (PrO)$_2$MeSi—(CH$_2$)$_3$—S—SiMe$_3$, (BuO)$_2$MeSi—(CH$_2$)$_3$—S—SiMe$_3$, (MeO)$_2$MeSi—(CH$_2$)$_2$—S—SiMe$_3$, (EtO)$_2$MeSi—(CH$_2$)$_2$—S—SiMe$_3$, (PrO)₂MeSi—(CH₂)₂—S—SiMe₃, (BuO)₂MeSi—(CH₂)₂—S—SiMe₃, (MeO)₂MeSi—CH₂—S—SiMe₃, (EtO)₂MeSi—CH₂—S—SiMe₃, (PrO)₂MeSi—CH₂—S—SiMe₃, (BuO)₂MeSi—CH₂—S—SiMe₃, (MeO)₂MeSi—CH₂—CMe₂-CH₂—S—SiMe₃, (EtO)₂MeSi—CH₂—CMe₂-CH₂—S—SiMe₃, (PrO)₂MeSi—CH₂—CMe₂-CH₂—S—SiMe₃, (BuO)₂MeSi—CH₂—CMe₂-CH₂—S—SiMe₃, (MeO)₂MeSi—CH₂—C(H)Me-CH₂—S—SiMe₃, (EtO)₂MeSi—CH₂—C(H)Me-CH₂—S—SiMe₃, (PrO)₂MeSi—CH₂—C(H)Me-CH₂—S—SiMe₃, (BuO)₂MeSi—CH₂—C(H)Me-CH₂—S—SiMe₃, (MeO)₂MeSi—(CH₂)₃—S-SiEt₃, (EtO)₂MeSi—(CH₂)₃—S-SiEt₃, (PrO)₂MeSi—(CH₂)₃—S-SiEt₃, (BuO)₂MeSi—(CH₂)₃-S-SiEt₃, (MeO)₂MeSi—(CH₂)₂—S-SiEt₃, (EtO)₂MeSi—(CH₂)₂—S-SiEt₃, (PrO)₂MeSi—(CH₂)₂—S-SiEt₃, (BuO)₂MeSi—(CH₂)₂—S-SiEt₃, (MeO)₂MeSi—CH₂—S-SiEt₃, (EtO)₂MeSi—CH₂—S-SiEt₃, (PrO)₂MeSi—CH₂—S-SiEt₃, (BuO)₂MeSi—CH₂—S-SiEt₃, (MeO)₂MeSi—CH₂—CMe₂-CH₂—S-SiEt₃, (EtO)₂MeSi—CH₂—CMe₂-CH₂—S-SiEt₃, (PrO)₂MeSi—CH₂—CMe₂-CH₂—S-SiEt₃, (BuO)₂MeSi—CH₂—CMe₂-CH₂—S-SiEt₃, (MeO)₂MeSi—CH₂—C(H)Me-CH₂—S-SiEt₃, (EtO)₂MeSi—CH₂—C(H)Me-CH₂—S-SiEt₃, (PrO)₂MeSi—CH₂—C(H)Me-CH₂—S-SiEt₃, (BuO)₂MeSi—CH₂—C(H)Me-CH₂—S-SiEt₃, (MeO)₂MeSi—(CH₂)₃—S—SiMe₂tBu, (EtO)₂MeSi—(CH₂)₃—S—SiMe₂tBu, (PrO)₂MeSi—(CH₂)₃—S—SiMe₂tBu, (BuO)₂MeSi—(CH₂)₃—S—SiMe₂tBu, (MeO)₂MeSi—(CH₂)₂—S—SiMe₂tBu, (EtO)₂MeSi—(CH₂)₂—S—SiMe₂tBu, (PrO)₂MeSi—(CH₂)₂—S—SiMe₂tBu, (BuO)₂MeSi—(CH₂)₂—S—SiMe₂tBu, (MeO)₂MeSi—CH₂—S—SiMe₂tBu, (EtO)₂MeSi—CH₂—S—SiMe₂tBu, (PrO)₂MeSi—CH₂—S—SiMe₂tBu, (BuO)₂MeSi—CH₂—S—SiMe₂tBu, (MeO)₂MeSi—CH₂—CMe₂-CH₂—S—SiMe₂tBu, (EtO)₂MeSi—CH₂—CMe₂-CH₂—S—SiMe₂tBu, (PrO)₂MeSi—CH₂—CMe₂-CH₂—S—SiMe₂tBu, (BuO)₂MeSi—CH₂—CMe₂-CH₂—S—SiMe₂tBu, (MeO)₂MeSi—CH₂—C(H)Me-CH₂—S—SiMe₂tBu, (EtO)₂MeSi—CH₂—C(H)Me-CH₂—S—SiMe₂tBu, (PrO)₂MeSi—CH₂—C(H)Me-CH₂—S—SiMe₂tBu, (BuO)₂MeSi—CH₂—C(H)Me-CH₂—S—SiMe₂tBu, (MeO)Me₂Si—(CH₂)₃—S—SiMe₃, (EtO)Me₂Si—(CH₂)₃—S—SiMe₃, (PrO)Me₂Si—(CH₂)₃—S—SiMe₃, (BuO)Me₂Si—(CH₂)₃—S—SiMe₃, (MeO)Me₂Si—(CH₂)₂—S—SiMe₃, (EtO)Me₂Si—(CH₂)₂—S—SiMe₃, (PrO)Me₂Si—(CH₂)₂—S—SiMe₃, (BuO)Me₂Si—(CH₂)₂—S—SiMe₃, (MeO)Me₂Si—CH₂—S—SiMe₃, (EtO)Me₂Si—CH₂—S—SiMe₃, (PrO)Me₂Si—CH₂—S—SiMe₃, (BuO)Me₂Si—CH₂—S—SiMe₃, (MeO)Me₂Si—CH₂—CMe₂-CH₂—S—SiMe₃, (EtO)Me₂Si—CH₂—CMe₂-CH₂—S—SiMe₃, (PrO)Me₂Si—CH₂—CMe₂-CH₂—S—SiMe₃, (BuO)Me₂Si—CH₂—CMe₂-CH₂—S—SiMe₃, (MeO)Me₂Si—CH₂—C(H)Me-CH₂—S—SiMe₃, (EtO)Me₂Si—CH₂—C(H)Me-CH₂—S—SiMe₃, (PrO)Me₂Si—CH₂—C(H)Me-CH₂—S—SiMe₃, (BuO)Me₂Si—CH₂—C(H)Me-CH₂—S—SiMe₃, (MeO)Me₂Si—(CH₂)₃—S-SiEt₃, (EtO)Me₂Si—(CH₂)₃—S-SiEt₃, (PrO)Me₂Si—(CH₂)₃—S-SiEt₃, (BuO)Me₂Si—(CH₂)₃—S-SiEt₃, (MeO)Me₂Si—(CH₂)₂—S-SiEt₃, (EtO)Me₂Si—(CH₂)₂—S-SiEt₃, (PrO)Me₂Si—(CH₂)₂—S-SiEt₃, (BuO)Me₂Si—(CH₂)₂—S-SiEt₃, (MeO)Me₂Si—CH₂—S-SiEt₃, (EtO)Me₂Si—CH₂—S-SiEt₃, (PrO)Me₂Si—CH₂—S-SiEt₃, (BuO)Me₂Si—CH₂—S-SiEt₃, (MeO)Me₂Si—CH₂—CMe₂-CH₂—S-SiEt₃, (EtO)Me₂Si—CH₂—CMe₂-CH₂—S-SiEt₃, (PrO)Me₂Si—CH₂—CMe₂-CH₂—S-SiEt₃, (BuO)Me₂Si—CH₂—CMe₂-CH₂—S-SiEt₃, (MeO)Me₂Si—CH₂—C(H)Me-CH₂—S-SiEt₃, (EtO)Me₂Si—CH₂—C(H)Me-CH₂—S-SiEt₃, (PrO)Me₂Si—CH₂—C(H)Me-CH₂—S-SiEt₃, (BuO)Me₂Si—CH₂—C(H)Me-CH₂—S-SiEt₃, (MeO)Me₂Si—(CH₂)₃—S—SiMe₂tBu, (EtO)Me₂Si—(CH₂)₃—S—SiMe₂tBu, (PrO)Me₂Si—(CH₂)₃—S—SiMe₂tBu, (BuO)Me₂Si—(CH₂)₃—S—SiMe₂tBu, (MeO)Me₂Si—(CH₂)₂—S—SiMe₂tBu, (EtO)Me₂Si—(CH₂)₂—S—SiMe₂tBu, (PrO)Me₂Si—(CH₂)₂—S—SiMe₂tBu, (BuO)Me₂Si—(CH₂)₂—S—SiMe₂tBu, (MeO)Me₂Si—CH₂—S—SiMe₂tBu, (EtO)Me₂Si—CH₂—S—SiMe₂tBu, (PrO)Me₂Si—CH₂—S—SiMe₂tBu, (BuO)Me₂Si—CH₂—S—SiMe₂tBu, (MeO)Me₂Si—CH₂—CMe₂-CH₂—S—SiMe₂tBu, (EtO)Me₂Si—CH₂—CMe₂-CH₂—S—SiMe₂tBu, (PrO)Me₂Si—CH₂—CMe₂-CH₂—S—SiMe₂tBu, (BuO)Me₂Si—CH₂—CMe₂-CH₂—S—SiMe₂tBu, (MeO)Me₂Si—CH₂—C(H)Me-CH₂—S—SiMe₂tBu, (EtO)Me₂Si—CH₂—C(H)Me-CH₂—S—SiMe₂tBu, (PrO)Me₂Si—CH₂—C(H)Me-CH₂—S—SiMe₂tBu, (BuO)Me₂Si—CH₂—C(H)Me-CH₂—S—SiMe₂tBu.

Most preferably, the sulfanylsilane compound of formula (1) is selected from (MeO)₃Si—(CH₂)₃—S—SiMe₂C(Me)₃, (MeO)₂(Me)Si—(CH₂)₃—S-SiEt₃, (MeO)₂(Me)Si—(CH₂)₃—S—Si(tBu)₃, (MeO)₂(Me)Si—(CH₂)₃—S—Si(Bz)₃ or (MeO)₂(Me)Si—(CH₂)₃—S—SiMe₂C(Me), and mixtures thereof.

Alternatively, a compound of formula (2) may be used:

$$((R^1O)_{x2'}(R^2)_{y2'}Si—R^3—S)_{s2'}M^*(R^4)_{t2'}(X^*)_{u2'}$$
formula (2), wherein M* is silicon or tin; $x_{2'}$ is an integer selected from 1, 2 and 3; y2' is an integer selected from 0, 1, and 2; wherein x2'+y2'=3; s2' is an integer selected from 2, 3 and 4; t2' is an integer selected from 0, 1 and 2;

u2' is an integer selected from 0, 1 and 2; wherein s2'+t2'+u2'=4; $R^1$ is independently selected from hydrogen and ($C_1$-$C_6$) alkyl; $R^2$ is independently selected from ($C_1$-$C_{16}$) alkyl, ($C_7$-$C_{16}$) alkylaryl and ($C_7$-$C_{16}$) arylalkyl; $R^3$ is at least divalent and is independently selected from ($C_1$-$C_{16}$) alkyl, ($C_8$-$C_{16}$) alkylarylalkyl, ($C_7$-$C_{16}$) arylalkyl and ($C_7$-$C_{16}$) alkylaryl, and each group may be substituted with one or more of the following groups: tertiary amine group, silyl group, ($C_7$-$C_{18}$) aralkyl group and ($C_6$-$C_{18}$) aryl group; $R^4$ is independently selected from ($C_1$-$C_{16}$) alkyl and ($C_7$-$C_{16}$) alkylaryl; X* is independently selected from chloride, bromide and —OR⁵*; wherein R⁵* is selected from ($C_1$-$C_{16}$) alkyl and ($C_7$-$C_{16}$) arylalkyl.

In a preferred embodiment, M* is a silicon atom; $R^3$ is divalent and is ($C_1$-$C_{16}$) alkyl; X* is —OR⁵*, wherein R⁵* is selected from ($C_1$-$C_4$) alkyl; $R^1$, $R^2$, and $R^4$ are independently selected from ($C_1$-$C_4$) alkyl; $s_2'$ and $t_2'$ are each 2 and $u_2'$ is 0; and $x_2'$ is 2 and $y_2'$ is 1; and the remaining groups and parameters are as defined for formula (2).

Specific preferred species of the silane sulfide modification agent of the present invention include the following compounds and their corresponding Lewis base adducts:
(MeO)₃Si—(CH₂)₃—S—Si(Me)₂-S—(CH₂)₃—Si(OMe)₃, (MeO)₃Si—(CH₂)₃—S—Si(Et)₂-S—(CH₂)₃—Si(OMe)₃, (MeO)₃Si—(CH₂)₃—S—Si(Bu)₂-S—(CH₂)₃—Si(OMe)₃, (EtO)₃Si—(CH₂)₃—S—Si(Me)₂-S—(CH₂)₃—Si(OEt)₃, (EtO)₃Si—(CH₂)₃—S—Si(Et)₂-S—(CH₂)₃—Si(OEt)₃, (EtO)₃Si—(CH₂)₃—S—Si(Bu)₂-S—(CH₂)₃—Si(OEt)₃, (PrO)₃Si—(CH₂)₃—S—Si(Me)₂-S—(CH₂)₃—Si(OPr)₃, (PrO)₃Si—(CH₂)₃—S—Si(Et)₂-S—(CH₂)₃—Si(OPr)₃, (PrO)₃Si—(CH₂)₃—S—Si(Bu)₂-S—(CH₂)₃—Si(OPr)₃, (MeO)₃Si—(CH₂)₂—S—Si(Me)₂-S—(CH₂)₂—Si(OMe)₃, (MeO)₃Si—(CH₂)₂—S—Si(Et)₂-S—(CH₂)₂—Si(OMe)₃, (MeO)₃Si—(CH₂)₂—S—Si(Bu)₂-S—(CH₂)₂—Si(OMe)₃, (EtO)₃Si—(CH₂)₂—S—Si(Me)₂-S—(CH₂)₂—Si(OEt)₃, (EtO)₃Si—(CH₂)₂—S—Si(Et)₂-S—(CH₂)₂—Si(OEt)₃, (EtO)₃Si—(CH₂)₂—S—Si(Bu)₂-S—(CH₂)₂—Si(OEt)₃, (PrO)₃Si—(CH₂)₂—S—Si(Me)₂-S—(CH₂)₂—Si(OPr)₃, (PrO)₃Si—CH₂)₂—S—Si(Et)₂-S—(CH₂)₂—Si(OPr)₃,
(PrO)₃Si—(CH₂)₂—S—Si(Bu)₂-S—(CH₂)₂—Si(OPr)₃,
(MeO)₃Si—CH₂—S—Si(Me)₂-S—CH₂—Si(OMe)₃,
(MeO)₃Si—CH₂—S—Si(Et)₂-S—CH₂—Si(OMe)₃,
(MeO)₃Si—CH₂—S—Si(Bu)₂-S—CH₂—Si(OMe)₃,
(EtO)₃Si—CH₂—S—Si(Me)₂-S—CH₂—Si(OEt)₃, (EtO)₃Si—CH₂—S—Si(Et)₂-S—CH₂—Si(OEt)₃, (EtO)₃Si—CH₂—S—Si(Bu)₂-S—CH₂—Si(OEt)₃, (PrO)₃Si—CH₂—S—Si(Me)₂-S—CH₂—Si(OPr)₃, (PrO)₃Si—CH₂—S—Si(Et)₂-S—CH₂—Si(OPr)₃, (PrO)₃Si—CH₂—S—Si(Bu)₂-S—CH₂—Si(OPr)₃, (MeO)₃Si—CH₂—CMe₂-CH₂—S—Si(Me)₂-S—CH₂—CMe₂-CH₂—Si(OMe)₃, (MeO)₃Si—CH₂—CMe₂-CH₂—S—Si(Et)₂-S—CH₂—CMe₂-CH₂—Si(OMe)₃, (MeO)₃Si—CH₂—CMe₂-CH₂—S—Si(Bu)₂-S—CH₂—CMe₂-CH₂—Si(OMe)₃, (EtO)₃Si—CH₂—CMe₂-CH₂—S—Si(Me)₂-S—CH₂—CMe₂-CH₂—Si(OEt)₃, (EtO)₃Si—CH₂—CMe₂-CH₂—S—Si(Et)₂-S—CH₂—CMe₂-CH₂—Si(OEt)₃, (EtO)₃Si—CH₂—CMe₂-CH₂—S—Si(BU)₂—S—CH₂—CMe₂-CH₂—Si(OEt)₃, (PrO)₃Si—CH₂—CMe₂-CH₂—S—Si(Me)₂-S—CH₂—CMe₂-CH₂—Si(OPr)₃, (PrO)₃Si—CH₂—CMe₂-CH₂—S—Si(Et)₂-S—CH₂—CMe₂-CH₂—Si(OPr)₃, (PrO)₃Si—CH₂—CMe₂-CH₂—S—Si(Bu)₂-S—CH₂—CMe₂-CH₂—Si(OPr)₃, (MeO)₃Si—CH₂—C(H)Me-CH₂—S—Si(Me)₂-S—CH₂—C(H)Me-CH₂—Si(OMe)₃, (MeO)₃Si—CH₂—C(H)Me-CH₂—S—Si(Et)₂-S—CH₂—C(H)Me-CH₂—Si(OMe)₃, (MeO)₃Si—CH₂—C(H)Me-CH₂—S—Si(Bu)₂-S—CH₂—C(H)Me-CH₂—Si(OMe)₃, (EtO)₃Si—CH₂—C(H)Me-CH₂—S—Si(Me)₂-S—CH₂—C(H)Me-CH₂—Si(OEt)₃, (EtO)₃Si—CH₂—C(H)Me-CH₂—S—Si(Et)₂-S—CH₂—C(H)Me-CH₂—Si(OEt)₃, (EtO)₃Si—CH₂—C(H)Me-CH₂—S—Si(Bu)₂-S—CH₂—C(H)Me-CH₂—Si(OEt)₃, (PrO)₃Si—CH₂—C(H)Me-CH₂—S—Si(Me)₂-S—CH₂—C(H)Me-CH₂—Si(OPr)₃, (PrO)₃Si—CH₂—C(H)Me-CH₂—S—Si(Et)₂-S—CH₂—C(H)Me-CH₂—Si(OPr)₃, (PrO)₃Si—CH₂—C(H)Me-CH₂—S—Si(Bu)₂-S—CH₂—C(H)Me-CH₂—Si(OPr)₃, (MeO)₂(Me)Si—(CH₂)₃—S—Si(Me)₂-S—(CH₂)₃—Si(OMe)₂(Me), (MeO)₂(Me)Si—(CH₂)₃—S—Si(Et)₂-S—(CH₂)₃—Si(OMe)₂(Me), (MeO)₂(Me)Si—(CH₂)₃—S—Si(Bu)₂-S—(CH₂)₃—Si(OMe)₂(Me), (EtO)₂(Me)Si—(CH₂)₃—S—Si(Me)₂-S—(CH₂)₃—Si(OEt)₂(Me), (EtO)₂(Me)Si—(CH₂)₃—S—Si(Et)₂-S—(CH₂)₃—Si(OEt)₂(Me), (EtO)₂(Me)Si—(CH₂)₃—S—Si(Bu)₂-S—(CH₂)₃—Si(OEt)₂(Me), (PrO)₂(Me)Si—(CH₂)₃—S—Si(Me)₂-S—(CH₂)₃—Si(OPr)₂(Me), (PrO)₂(Me)Si—(CH₂)₃—S—Si(Et)₂-S—(CH₂)₃—Si(OPr)₂(Me), (PrO)₂(Me)Si—(CH₂)₃—S—Si(Bu)₂-S—(CH₂)₃—Si(OPr)₂(Me), (MeO)₂(Me)Si—(CH₂)₂—S—Si(Me)₂-S—(CH₂)₂—Si(OMe)₂(Me), (MeO)₂(Me)Si—(CH₂)₂—S—Si(Et)₂-S—(CH₂)₂—Si(OMe)₂(Me), (MeO)₂(Me)Si—(CH₂)₂—S—Si(Bu)₂-S—(CH₂)₂—Si(OMe)₂(Me), (EtO)₂(Me)Si—(CH₂)₂—S—Si(Me)₂-S—(CH₂)₂—Si(OEt)₂(Me), (EtO)₂(Me)Si—(CH₂)₂—S—Si(Et)₂-S—(CH₂)₂—Si(OEt)₂(Me), (EtO)₂(Me)Si—(CH₂)₂—S—Si(Bu)₂-S—(CH₂)₂—Si(OEt)₂(Me), (PrO)₂(Me)Si—(CH₂)₂—S—Si(Me)₂-S—(CH₂)₂—Si(OPr)₂(Me), (PrO)₂(Me)Si—(CH₂)₂—S—Si(Et)₂-S—(CH₂)₂—Si(OPr)₂(Me), (PrO)₂(Me)Si—(CH₂)₂—S—Si(Bu)₂-S—(CH₂)₂—Si(OPr)₂(Me), (MeO)₂(Me)Si—CH₂—S—Si(Me)₂-S—CH₂—Si(OMe)₂(Me), (MeO)₂(Me)Si—CH₂—S—Si(Et)₂-S—CH₂—Si(OMe)₂(Me), (MeO)₂(Me)Si—CH₂—S—Si(Bu)₂-S—CH₂—Si(OMe)₂(Me), (EtO)₂(Me)Si—CH₂—S—Si(Me)₂-S—CH₂—Si(OEt)₂(Me), (EtO)₂(Me)Si—CH₂—S—Si(Et)₂-S—CH₂—Si(OEt)₂(Me), (EtO)₂(Me)Si—CH₂—S—Si(Bu)₂-S—CH₂—Si(OEt)₂(Me), (PrO)₂(Me)Si—CH₂—S—Si(Me)₂-S—CH₂—Si(OPr)₂(Me), (PrO)₂(Me)Si—CH₂—S—Si(Et)₂-S—CH₂—Si(OPr)₂(Me), (PrO)₂(Me)Si—CH₂—S—Si(Bu)₂-S—CH₂—Si(OPr)₂(Me), (MeO)₂(Me)Si—CH₂—CMe₂-CH₂—S—Si(Me)₂-S—CH₂—CMe₂-CH₂—Si(OMe)₂(Me), (MeO)₂(Me)Si—CH₂—CMe₂-CH₂—S—Si(Et)₂-S—CH₂—CMe₂-CH₂—Si(OMe)₂(Me), (MeO)₂(Me)Si—CH₂—CMe₂-CH₂—S—Si(Bu)₂-S—CH₂—CMe₂-CH₂—Si(OMe)₂(Me), (EtO)₂(Me)Si—CH₂—CMe₂-CH₂—S—Si(Me)₂-S—CH₂—CMe₂-CH₂—Si(OEt)₂(Me), (EtO)₂(Me)Si—CH₂—CMe₂-CH₂—S—Si(Et)₂-S—CH₂—CMe₂-CH₂—Si(OEt)₂(Me), (EtO)₂(Me)Si—CH₂—CMe₂-CH—S—Si(BU)₂—S—CH₂—CMe₂-CH₂—Si(OEt)₂(Me), (PrO)₂(Me)Si—CH₂—CMe₂-CH₂—S—Si(Me)₂-S—CH₂—CMe₂-CH₂—Si(OPr)₂(Me), (PrO)₂(Me)Si—CH₂—CMe₂-CH₂—S—Si(Et)₂-S—CH₂—CMe₂-CH₂—Si(OPr)₂(Me), (PrO)₂(Me)Si—CH₂—CMe₂-CH₂—S—Si(BU)₂—S—CH₂—CMe₂-CH₂—Si(OPr)₂(Me), (MeO)₂(Me)Si—CH₂—C(H)Me-CH₂—S—Si(Me)₂-S—CH₂—C(H)Me-CH₂—Si(OMe)₂(Me), (MeO)₂(Me)Si—CH₂—C(H)Me-CH₂—S—Si(Et)₂-S—CH₂—C(H)Me-CH₂—Si(OMe)₂(Me), (MeO)₂(Me)Si—CH₂—C(H)Me-CH₂—S—Si(Bu)₂-S—CH₂—C(H)Me-CH₂—Si(OMe)₂(Me), (EtO)₂(Me)Si—CH₂—C(H)Me-CH₂—S—Si(Me)₂-S—CH₂—C(H)Me-CH₂—Si(OEt)₂(Me), (EtO)₂(Me)Si—CH₂—C(H)Me-CH₂—S—Si(Et)₂-S—CH₂—C(H)Me-CH₂—Si(OEt)₂(Me), (EtO)₂(Me)Si—CH₂—C(H)Me-CH₂—S—Si(Bu)₂-S—CH₂—C(H)Me-CH₂—Si(OEt)₂(Me), (PrO)₂(Me)Si—CH₂—C(H)Me-CH₂—S—Si(Me)₂-S—CH₂—C(H)Me-CH₂—Si(OPr)₂(Me), (PrO)₂(Me)Si—CH₂—C(H)Me-CH₂—S—Si(Et)₂-S—CH₂—C(H)Me-CH₂—Si(OPr)₂(Me), (PrO)₂(Me)Si—CH₂—C(H)Me-CH₂—S—Si(Bu)₂-S—CH₂—C(H)Me-CH₂—Si(OPr)₂(Me), (MeO)₃Si—(CH₂)₃—S—Sn(Me)₂-S—(CH₂)₃—Si(OMe)₃, (MeO)₃Si—(CH₂)₃—S—Sn(Et)₂-S—(CH₂)₃—Si(OMe)₃, (MeO)₃Si—(CH₂)₃—S—Sn(Bu)₂-S—(CH₂)₃—Si(OMe)₃, (EtO)₃Si—(CH₂)₃—S—Sn(Me)₂-S—(CH₂)₃—Si(OEt)₃, (EtO)₃Si—(CH₂)₃—S—Sn(Et)₂-S—(CH₂)₃—Si(OEt)₃, (EtO)₃Si—(CH₂)₃—S—Sn(Bu)₂-S—(CH₂)₃—Si(OEt)₃, (PrO)₃Si—(CH₂)₃—S—Sn(Me)₂-S—(CH₂)₃—Si(OPr), (PrO)₃Si—(CH₂)₃—S—Sn(Et)₂-S—(CH₂)₃—Si(OPr)₃, (PrO)₃Si—(CH₂)₃—S—Sn(Bu)₂-S—(CH₂)₃—Si(OPr)₃, (MeO)₃Si—(CH₂)₂—S—Sn(Me)₂-S—(CH₂)₂—Si(OMe)₃, (MeO)₃Si—(CH₂)₂—S—Sn(Et)₂-S—(CH₂)₂—Si(OMe)₃, (MeO)₃Si—(CH₂)₂—S—Sn(Bu)₂-S—(CH₂)₂—Si(OMe)₃, (EtO)₃Si—(CH₂)₂—S—Sn(Me)₂-S—(CH₂)₂—Si(OEt)₃, (EtO)₃Si—(CH₂)₂—S—Sn(Et)₂-S—(CH₂)₂—Si(OEt)₃, (EtO)₃Si—(CH₂)₂—S—Sn(Bu)₂-S—(CH₂)₂—Si(OEt)₃, (PrO)₃Si—(CH₂)₂—S—Sn(Me)₂-S—(CH₂)₂—Si(OPr)₃, (PrO)₃Si—(CH₂)₂—S—Sn(Et)₂-S—(CH₂)₂—Si(OPr)₃, (PrO)₃Si—(CH₂)₂—S—Sn(Bu)₂-S—(CH₂)₂—Si(OPr)₃, (MeO)₃Si—CH₂—S—Sn(Me)₂-S—CH₂—Si(OMe)₃, (MeO)₃Si—CH₂—S—Sn(Et)₂-S—CH₂—Si(OMe)₃, (MeO)₃Si—CH₂—S—Sn(Bu)₂-S—CH₂—Si(OMe)₃, (EtO)₃Si—CH₂—S—Sn(Me)₂-S—CH₂—Si(OEt)₃, (EtO)₃Si—CH₂—S—Sn(Et)₂-S—CH₂—Si(OEt)₃, (EtO)₃Si—CH₂—S—Sn(Bu)₂-S—CH₂—Si(OEt)₃, (PrO)₃Si—CH₂—S—Sn(Me)₂-S—CH₂—Si(OPr)₃, (PrO)₃Si—CH₂—S—Sn(Et)₂-S—CH₂—Si(OPr)₃, (PrO)₃Si—CH₂—S—Sn(Bu)₂-S—CH₂—Si(OPr)₃, (MeO)₃Si—CH₂—CMe₂-CH₂—S—Sn(Me)₂-S—CH₂—CMe₂-CH₂—Si(OMe)₃, (MeO)₃Si—CH₂—CMe₂-CH₂—S—Sn(Et)₂-S—CH₂—CMe₂-CH₂—Si(OMe)₃, (MeO)₃Si—CH₂—CMe₂-CH₂—S—Sn(Bu)₂-S—CH₂—CMe₂-CH₂—Si(OMe)₃, (EtO)₃Si—CH₂—CMe₂-CH₂—S—Sn(Me)₂-S—CH₂—CMe₂-CH₂—Si(OEt)₃, (EtO)₃Si—CH₂—CMe₂-CH₂—S—Sn(Et)₂-S—CH₂—CMe₂-CH₂—Si(OEt)₃, (EtO)₃Si—CH₂—CMe₂-CH₂—S—Sn(Bu)₂-S—CH₂—CMe₂-CH₂—Si(OEt)₃, (PrO)₃Si—CH₂—CMe₂-CH₂—S—Sn(Me)₂-S—CH₂—CMe₂-CH₂—Si(OPr)₃, (PrO)₃Si—CH₂—CMe₂-CH₂—S—

Sn(Et)$_2$-S—CH$_2$—CMe$_2$-CH$_2$—Si(OPr)$_3$, (PrO)$_3$Si—CH$_2$—CMe$_2$-CH$_2$—S—Sn(Bu)$_2$-S—CH$_2$—CMe$_2$-CH$_2$—Si(OPr)$_3$, (MeO)$_3$Si—CH$_2$—C(H)Me-CH$_2$—S—Sn(Me)$_2$-S—CH$_2$—C(H)Me-CH$_2$—Si(OMe)$_3$, (MeO)$_3$Si—CH$_2$—C(H)Me-CH$_2$—S—Sn(Et)$_2$-S—CH$_2$—C(H)Me-CH$_2$—Si(OMe)$_3$, (MeO)$_3$Si—CH$_2$—C(H)Me-CH$_2$—S—Sn(Bu)$_2$-S—CH$_2$—C(H)Me-CH$_2$—Si(OMe)$_3$, (EtO)$_3$Si—CH$_2$—C(H)Me-CH—S—Sn(Me)$_2$-S—CH$_2$—C(H)Me-CH$_2$—Si(OEt)$_3$, (EtO)$_3$Si—CH$_2$—C(H)Me-CH$_2$—S—Sn(Et)$_2$-S—CH$_2$—C(H)Me-CH$_2$—Si(OEt)$_3$, (EtO)$_3$Si—CH$_2$—C(H)Me-CH$_2$—S—Sn(Bu)$_2$-S—CH$_2$—C(H)Me-CH$_2$—Si(OEt)$_3$, (PrO)$_3$Si—CH$_2$—C(H)Me-CH$_2$—S—Sn(Me)$_2$-S—CH$_2$—C(H)Me-CH$_2$—Si(OPr)$_3$, (PrO)$_3$Si—CH$_2$—C(H)Me-CH$_2$—S—Sn(Et)$_2$-S—CH$_2$—C(H)Me-CH$_2$—Si(OPr)$_3$, (PrO)$_3$Si—CH$_2$—C(H)Me-CH$_2$—S—Sn(Bu)$_2$-S—CH$_2$—C(H)Me-CH$_2$—Si(OPr)$_3$, (MeO)$_2$(Me)Si—(CH$_2$)$_3$—S—Sn(Me)$_2$-S—(CH$_2$)$_3$—Si(OMe)$_2$(Me), (MeO)$_2$(Me)Si—(CH$_2$)$_3$—S—Sn(Et)$_2$-S—(CH$_2$)$_3$—Si(OMe)$_2$(Me), (MeO)$_2$(Me)Si—(CH$_2$)$_3$—S—Sn(Bu)$_2$-S—(CH$_2$)$_3$—Si(OMe)$_2$(Me), (EtO)$_2$(Me)Si—(CH$_2$)$_3$—S—Sn(Me)$_2$-S—(CH$_2$)$_3$—Si(OEt)$_2$(Me), (EtO)$_2$(Me)Si—(CH$_2$)$_3$—S—Sn(Et)$_2$-S—(CH$_2$)$_3$—Si(OEt)$_2$(Me), (EtO)$_2$(Me)Si—(CH$_2$)$_3$—S—Sn(Bu)$_2$-S—(CH$_2$)$_3$—Si(OEt)$_2$(Me), (PrO)$_2$(Me)Si—(CH$_2$)$_3$—S—Sn(Me)$_2$-S—(CH$_2$)$_3$—Si(OPr)$_2$(Me), (PrO)$_2$(Me)Si—(CH$_2$)$_3$—S—Sn(Et)$_2$-S—(CH$_2$)$_3$—Si(OPr)$_2$(Me), (PrO)$_2$(Me)Si—(CH$_2$)$_3$—S—Sn(Bu)$_2$-S—(CH$_2$)$_3$—Si(OPr)$_2$(Me), (PrO)$_2$(Me)Si—(CH$_2$)$_3$—S—Sn(Et)$_2$-S—(CH$_2$)$_3$—Si(OPr)$_2$(Me), (PrO)$_2$(Me)Si—(CH$_2$)$_3$—S—Sn(Bu)$_2$-S—(CH$_2$)$_3$—Si(OPr)$_2$(Me), (MeO)$_2$(Me)Si—(CH$_2$)$_2$—S—Sn(Me)$_2$-S—(CH$_2$)$_2$—Si(OMe)$_2$(Me), (MeO)$_2$(Me)Si—(CH$_2$)$_2$—S—Sn(Et)$_2$-S—(CH$_2$)$_2$—Si(OMe)$_2$(Me), (MeO)$_2$(Me)Si—(CH$_2$)$_2$—S—Sn(Bu)$_2$-S—(CH$_2$)$_2$—Si(OMe)$_2$(Me), (EtO)$_2$(Me)Si—(CH$_2$)$_2$—S—Sn(Me)$_2$-S—(CH$_2$)$_2$—Si(OEt)$_2$(Me), (EtO)$_2$(Me)Si—(CH$_2$)$_2$—S—Sn(Et)$_2$-S—(CH$_2$)$_2$—Si(OEt)$_2$(Me), (EtO)$_2$(Me)Si—(CH$_2$)$_2$—S—Sn(Bu)$_2$-S—(CH$_2$)$_2$—Si(OEt)$_2$(Me), (PrO)$_2$(Me)Si—(CH$_2$)$_2$—S—Sn(Me)$_2$-S—(CH$_2$)$_2$—Si(OPr)$_2$(Me), (PrO)$_2$(Me)Si—(CH$_2$)$_2$—S—Sn(Et)$_2$-S—(CH$_2$)$_2$—Si(OPr)$_2$(Me), (PrO)$_2$(Me)Si—(CH$_2$)$_2$—S—Sn(Bu)$_2$-S—(CH$_2$)$_2$—Si(OPr)$_2$(Me), (MeO)$_2$(Me)Si—CH$_2$—S—Sn(Me)$_2$-S—CH$_2$—Si(OMe)$_2$(Me), (MeO)$_2$(Me)Si—CH$_2$—S—Sn(Et)$_2$-S—CH$_2$—Si(OMe)$_2$(Me), (MeO)$_2$(Me)Si—CH$_2$—S—Sn(Bu)$_2$-S—CH$_2$—Si(OMe)$_2$(Me), (EtO)$_2$(Me)Si—CH$_2$—S—Sn(Me)$_2$-S—CH$_2$—Si(OEt)$_2$(Me), (EtO)$_2$(Me)Si—CH$_2$—S—Sn(Et)$_2$-S—CH$_2$—Si(OEt)$_2$(Me), (EtO)$_2$(Me)Si—CH$_2$—S—Sn(Bu)$_2$-S—CH$_2$—Si(OEt)$_2$(Me), (PrO)$_2$(Me)Si—CH$_2$—S—Sn(Me)$_2$-S—CH$_2$—Si(OPr) 2(Me), (PrO)$_2$(Me)Si—CH$_2$—S—Sn(Et)$_2$-S—CH$_2$—Si(OPr)$_2$(Me), (PrO)$_2$(Me)Si—CH$_2$—S—Sn(Bu)$_2$-S—CH$_2$—Si(OPr)$_2$(Me), (MeO)$_2$(Me)Si—CH$_2$—CMe$_2$-CH$_2$—S—Sn(Me)$_2$-S—CH$_2$—CMe$_2$-CH$_2$—Si(OMe)$_2$(Me), (MeO)$_2$(Me)Si—CH$_2$—CMe$_2$-CH$_2$—S—Sn(Et)$_2$-S—CH$_2$—CMe$_2$-CH$_2$—Si(OMe)$_2$(Me), (MeO)$_2$(Me)Si—CH$_2$—CMe$_2$-CH$_2$—S—Sn(Bu)$_2$-S—CH$_2$—CMe$_2$-CH$_2$—Si(OMe)$_2$(Me), (EtO)$_2$(Me)Si—CH$_2$—CMe$_2$-CH$_2$—S—Sn(Me)$_2$-S—CH$_2$—CMe$_2$-CH$_2$—Si(OEt)$_2$(Me), (EtO)$_2$(Me)Si—CH$_2$—CMe$_2$-CH$_2$—S—Sn(Et)$_2$-S—CH$_2$—CMe$_2$-CH$_2$—Si(OEt)$_2$(Me), (EtO)$_2$(Me)Si—CH$_2$—CMe$_2$-CH$_2$—S—Sn(Bu)$_2$-S—CH$_2$—CMe$_2$-CH$_2$—Si(OEt)$_2$(Me), (PrO)$_2$(Me)Si—CH$_2$—CMe$_2$-CH$_2$—S—Sn(Me)$_2$-S—CH$_2$—CMe$_2$-CH$_2$—Si(OPr)$_2$(Me), (PrO)$_2$(Me)Si—CH$_2$—CMe$_2$-CH$_2$—S—Sn(Et)$_2$-S—CH$_2$—CMe$_2$-CH$_2$—Si(OPr)$_2$(Me), (PrO)$_2$(Me)Si—CH$_2$—CMe$_2$-CH$_2$—S—Sn(Bu)$_2$-S—CH$_2$—CMe$_2$-CH$_2$—Si(OPr)$_2$(Me), (MeO)$_2$(Me)Si—CH$_2$—C(H)Me-CH$_2$—S—Sn(Me)$_2$-S—CH$_2$—C(H)Me-CH$_2$—Si(OMe)$_2$(Me), (MeO)$_2$(Me)Si—CH$_2$—C(H)Me-CH$_2$—S—Sn(Et)$_2$-S—CH$_2$—C(H)Me-CH$_2$—Si(OMe)$_2$(Me), (MeO)$_2$(Me)Si—CH$_2$—C(H)Me-CH$_2$—S—Sn(Bu)$_2$-S—CH$_2$—C(H)Me-CH$_2$—Si(OMe)$_2$(Me), (EtO)$_2$(Me)Si—CH$_2$—C(H)Me-CH$_2$—S—Sn(Me)$_2$-S—CH$_2$—C(H)Me-CH$_2$—Si(OEt)$_2$(Me), (EtO)$_2$(Me)Si—CH$_2$—C(H)Me-CH$_2$—S—Sn(Et)$_2$-S—CH$_2$—C(H)Me-CH$_2$—Si(OEt)$_2$(Me), (EtO)$_2$(Me)Si—CH$_2$—C(H)Me-CH$_2$—S—Sn(Bu)$_2$-S—CH$_2$—C(H)Me-CH$_2$—Si(OEt)$_2$(Me), (PrO)$_2$(Me)Si—CH$_2$—C(H)Me-CH$_2$—S—Sn(Me)$_2$-S—CH$_2$—C(H)Me-CH$_2$—Si(OPr)$_2$(Me), (PrO)$_2$(Me)Si—CH$_2$—C(H)Me-CH$_2$—S—Sn(Et)$_2$-S—CH$_2$—C(H)Me-CH$_2$—Si(OPr)$_2$(Me), and/or (PrO)$_2$(Me)Si—CH$_2$—C(H)Me-CH$_2$—S—Sn(Bu)$_2$-S—CH$_2$—C(H)Me-CH$_2$—Si(OPr)$_2$(Me).

Modification compounds of formula (2), as described above, are disclosed in more detail in WO 2014/040639 which is entirely incorporated by reference.

Alternatively, a compound of formula (12) may be used.

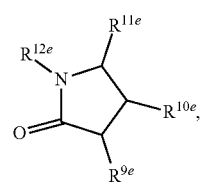

formula (12)

wherein $R^{9e}$, $R^{10e}$, $R^{11e}$ and $R^{12e}$ are independently selected from hydrogen, ($C_1$-$C_{16}$) alkyl, ($C_6$-$C_{16}$) aryl and ($C_7$-$C_{16}$) aralkyl, preferably $R^{9e}$, $R^{10e}$, Rile are hydrogen and $R^{12e}$ is methyl.

In a preferred embodiment, therefore, the compound of formula (12) is N-methyl-2-pyrrolidone.

In the modification step, one or more modification compounds of formula (1), formula (2) or formula (12), as defined above, may be added to the living polymer in an amount such that the molar ratio is of from 0.05 or more, preferably of from 0.1 or more, more preferably of from 0.15 or more.

The modification compounds represented by formula (1), formula (2) or formula (12) may be preferably added at almost complete or complete conversion of the monomer(s) to be polymerized, preferably at a conversion rate of the anionic polymerization of higher than 85 percent by weight, based on the amount of monomers provided.

The phrase "amount of monomers provided", "charged amount of monomers", or similar terms, as used herein, refer to the amount of monomers provided in the polymerization step.

In a preferred embodiment, the conversion rate is at least 92.0 percent by weight, preferably higher than 94.0 percent by weight, based on the amount of monomers provided.

The term "monomer conversion", as used herein, refers to the monomer conversion (for example the sum conversion of styrene and 1,3-butadiene) determined, e.g. at the outlet of a given polymerization reactor.

Preferably, a substantial amount of the living polymer chain ends is not terminated prior to the reaction with the modification compound, i.e. the living polymer chain ends are present and capable of reacting with the modification compound represented by formula (1), formula (2) or formula (12) in a polymer chain end modification reaction.

It may be beneficial to change the polymer chain ends to dienyl chain ends before charging of the modification compounds by addition of small amounts of the conjugated diene monomer, such as 1,3-butadiene. In the course of the modification reaction, one or more polymer chain(s) may react with said modification compounds.

Thus, the modification reaction using a compound represented by formula (1), formula (2) and/or formula (12), as described above, results in modified or functionalized elastomeric polymers.

In a preferred embodiment, these elastomeric polymers have a modification degree (mol % of modified chain-ends, based on the total number of produced macromolecules) of 20% or more, preferably 50% or more, most preferably 80% or more.

The modification compound represented by formula (1), formula (2) and/or formula (12) may be directly added to the polymer solution without dilution.

However, it may be beneficial to add the compounds represented by formula (1), formula (2) and/or formula (12) in solution using an inert solvent, e.g. a solvent, as described above.

In general, it is to be understood that the terms "modification" or "functionalization" may be used interchangeably.

Properties of the First Elastomeric Polymer

In one embodiment, the elastomeric polymer (a) is preferably a random or block co- or terpolymer obtainable by (I) anionic polymerization of at least one conjugated diene, preferably 1,3-butadiene or isoprene, with at least one α-olefin monomer, preferably with styrene and/or divinylbenzene, (II) coupling of the random or block co- or terpolymer chains obtained in (I) by addition and reaction of at least coupling agent such as a compound represented by formula (16), formula (II) and/or formula (III), as defined above and (III) modification of the coupled random or block co- or terpolymer chains obtained in (II) by addition and reaction of at least one or more compounds represented by formula (1), formula (2) and/or formula (12), as defined above.

Most preferably, the first elastomeric polymer (a) is a random co- or terpolymer, i.e. has a single glass transition temperature.

Most preferably, furthermore, the first elastomeric polymer (a) is a random styrene-butadiene-copolymer (herein abbreviated as SBR), a random coupled SBR or a random coupled and modified SBR using the coupling and modification agents, as described above.

The elastomeric polymer (a), such as a styrene-butadiene-copolymer, has a weight-average molecular weight (herein abbreviated as Mw) in the range of 300,000 to 4,000,000 g/mol, more preferably in the range of 400,000 to 2,000,000 g/mol, most preferably in the range of 500,000 to 1,000,000 g/mol, as measured by size exclusion chromatography (herein abbreviated as SEC) and converted to polystyrene equivalents.

In other words, the elastomeric polymer (a) is a high molecular weight polymer.

In a preferred embodiment, the α-olefin-, such as styrene-, content of the elastomeric polymer (a), as defined above, ranges from 10 to 50 percent by weight.

The term "α-olefin content" or "styrene-content", as used herein, refers to the mass (or weight) percentage of α-olefin or styrene in the elastomeric polymer (a), based on the total weight of the elastomeric polymer.

In a preferred embodiment, the content of the conjugated diene monomer, such as the vinyl-content, in the first elastomeric polymer (a) is preferably from 10 to 70 percent by weight.

The terms "vinyl content" or "content of the conjugated diene monomer", as used herein, refers to the mass (or weight) percentage of the at least one diene, such as e.g. 1,3-butadiene and/or isoprene, that incorporates in the polymer chain of the elastomeric polymer (a) in the 1,2- and in the 1,2- or 3,4-position, respectively, and is based on the portion of diene, e.g. butadiene and/or isoprene (total amount of polymerized diene) in the elastomeric polymer.

The amount of component (a) in the polymer blend is in the range of 50 to 95 percent by weight, based on the total weight of the polymer blend.

It is further preferred that the elastomeric polymer (a) in the polymer blend according to the invention has a glass transition temperature (herein abbreviated as $T_g$) of −50° C. to −5° C., as measured by DSC (see test methods below).

When the first elastomeric polymer (a) is a random polymer, the latter is characterized by only one glass transition temperature, whereas when it is typically characterized by two distinct glass transition temperatures when the polymer (a) is a block copolymer.

Component (b)—the Low Molecular Weight Elastomeric Polymer Having a Branched or Coupled Structure Component (b) is obtainable by (i) anionic polymerization of at least one conjugated diene monomer and one or more α-olefin monomer(s) in the presence of a polymerization initiator in an organic solvent and (ii) coupling of the polymer chains obtained in (i) by a coupling agent.

Further, (iii) the polymer chains obtained in (ii) may optionally be modified by a modification agent.

For specific monomer(s) and suitable conditions for the anionic polymerization reaction (i), the coupling reaction (ii) and the modification reaction (iii), if applicable, reference is made to the above described polymerization reaction (I), coupling reaction (II) and modification reaction (III) for the preparation of component (a).

Thus, the reagent(s) and condition(s) applied for the preparation of component (b) are typically the same as disclosed above for the elastomeric polymer (a), unless otherwise indicated.

In general, the reagent(s) and condition(s) of the anionic polymerization reaction (i) are the same as discussed above for component (a), with the proviso that compounds represented by the formula (6) or formula (7) as defined above are not used as polymerization initiator.

Further, the coupling rate of the second elastomeric polymer is preferably higher than 60% by weight As mentioned above, the coupling rate of the second elastomeric polymer (b) is preferably lower than 98% by weight.

For the optional modification reaction (iii), the reagent(s) and condition(s) of the modification reaction (iii) are the same as discussed above for component (a), with the proviso that compounds represented by the formula (1) or formula (12) as defined above are not used as modification or functionalization agent(s).

Properties of the Second Elastomeric Polymer

In a preferred embodiment, the elastomeric polymer (b) is a random or block co- or terpolymer obtainable by (i) anionic polymerization of at least one conjugated diene, preferably 1,3-butadiene or isoprene, with at least one α-olefin monomer, preferably with styrene and/or divinylbenzene, (ii) coupling of the random or block co- or terpolymer chains obtained in (i) by addition and reaction of at least coupling agent such as a compound represented by formula (16), formula (II) and/or formula (III), as defined above and (iii) modification of the coupled random or block co- or terpolymer chains obtained in (ii) by addition and reaction of at least one or more compounds represented by formula (2), as defined above.

Most preferably, the second elastomeric polymer (b) is a random co- or terpolymer, i.e. has a single glass transition temperature.

Most preferably, furthermore, the second elastomeric polymer (b) is a coupled SBR or a coupled and modified SBR using the coupling and modification agents, as described above.

The elastomeric polymer (b), such as a coupled styrene-butadiene-copolymer, has a weight-average molecular weight (herein abbreviated as $M_w$) in the range of 5,000-40,000 g/mol, more preferably in the range of 8,000-30,000 g/mol, even more preferably in the range of 10,000-20,000 g/mol, most preferably in the range of 12,000-15,000 g/mol, as measured by size exclusion chromatography (herein abbreviated as SEC) and converted to polystyrene equivalents.

In other words, the elastomeric polymer (b) is a low molecular weight polymer.

In one embodiment, the α-olefin-, such as styrene-, content of the elastomeric polymer (b), as defined above, ranges from 5 to 50 percent by weight, preferably 10 to 30 percent by weight.

In one embodiment, the content of the conjugated diene monomer, such as the vinyl-content, in the second elastomeric polymer (b) is preferably from 30 to 75 percent by weight, preferably 50 to 70 percent by weight.

As mentioned above, the amount of component (b) in the polymer blend, as defined in claim 1, is in the range of 5 to 50 percent by weight, more preferably 10 to 30 percent by weight, most preferably 15 to 25 percent by weight based on the total weight of the polymer blend.

Component (c)—an Optionally Present (Conventional) Extender Oil

Component (c) of the polymer blend is optionally present and corresponds to one or more extender oil(s), which are also known as softener(s).

The amount of component (c) in the polymer blend, if present, is in the range of 0 to 13 percent by weight, i.e. is up to 13% by weight, based on the total weight of the polymer blend.

For representative examples and classification of the extender oils, reference is made to International Patent Application No. PCT/US09/045553 and U.S. Patent Application Publication No. 2005/0159513, each of which is incorporated herein by reference in its entirety.

Representative extender oils include, but are not limited to, MES (Mild Extraction Solvate), TDAE (Treated Distillate Aromatic Extract), RAE (Residual Aromatic Extract) including, without limitation, T-RAE and S-RAE, DAE including T-DAE and NAP (light and heavy naphthenic oils), including, but not limited to, Nytex 4700, Nytex 8450, Nytex 5450, Nytex 832, Tufflo 2000, and Tufflo 1200. In addition, native oils, including, but not limited to, vegetable oils, can be used as extender oils.

Representative oils also include functionalized variations of the aforementioned oils, particularly epoxidized or hydroxylated oils.

The aforementioned extender oils comprise different concentrations of polycyclic aromatic compounds, paraffinics, naphthenics and aromatics, and have different glass transition temperatures.

The above mentioned types of oil have been characterized (*Kautschuk Gummi Kunststoffe*, vol. 52, pages 799-805).

In preferred embodiments, MES, RAE and/or TDAE are used as (conventional) extender oils.

Methods for Preparing the Polymer Blend

According to the present disclosure, the polymer blend may be prepared in solution either by in situ polymerization of both components (a) and (b), as described above, in the same process or by mixing of the respective polymer solutions, as obtained after the polymerization reaction (including the coupling and/or modification reaction, if applicable) of the corresponding components (a) and (b), as described above.

The optional extender oil(s) (c), if used at all, are then mixed into the obtained polymer solution, containing both the elastomeric polymer (a) and the elastomeric polymer (b).

The amounts of each component are as defined in the present disclosure.

The polymer blend is then recovered from the polymer blend solution as commonly known and used in industrial scale for rubber production for instance via steam stripping at an elevated temperature, preferably about 100° C., followed by a common dewatering step and drying at elevated temperatures.

The resulting solvent-free polymer blend may preferably have a Mooney viscosity in the range of 35-80.

The Crosslinkable Elastomeric Composition

As mentioned above, the tire for vehicles of the present invention comprises a tire component comprising a crosslinked elastomeric material obtained by crosslinking a crosslinkable elastomeric composition comprising in turn the polymer blend described above and, optionally, one or more extender oil(s).

In a preferred embodiment, the crosslinkable elastomeric composition comprises at least 20 phr of the polymer blend described above, more preferably from 20 to 80 phr of said polymer blend.

The Applicant observed that in this case best results were achieved in terms of a better balance of the tire performances on wet and snow ground and an equal or better performance in terms of braking on dry surfaces, especially in winter tire applications In a preferred embodiment, the crosslinkable elastomeric composition comprises at least 2 phr of said second elastomeric polymer (b), more preferably from 5 to 10 phr of said second elastomeric polymer (b).

As is customary in the art of tire manufacture, the crosslinkable elastomeric composition preferably comprises, in addition to the polymer blend described above, one or more extender oil(s). The latter, may preferably selected between the extender oil(s) described above in connection with the polymer blend.

Preferably, the crosslinkable elastomeric composition comprises from 10 to 70 phr of at least one extender oil.

As is customary in the art of tire manufacture, the crosslinkable elastomeric composition also preferably comprises, in addition to the polymer blend described above, at least one additional diene elastomeric polymer (D) selected from those commonly used in the field of elastomeric materials which may be used for producing tires.

Within the framework of the present description and of the following claims, the term "diene polymer" refers to a polymer or copolymer derived from the polymerisation of one or more different monomers, of which at least one is a conjugated diene (conjugated diolefin).

Preferably, the additional diene elastomeric polymers (D) suitable for the purposes of the present invention have a weight-average molecular weight ($M_w$) greater than 80,000 g/mol.

Preferably, the additional diene elastomeric polymers (D) suitable for the purposes of the present invention are crosslinkable with sulphur.

Preferably, the additional diene elastomeric polymers (D) suitable for the purposes of the present invention are elastomeric polymers or copolymers having an unsaturated chain having a glass transition temperature ($T_g$) generally lower than 20° C., preferably comprised in the range from 0° C. to −110° C.

Preferably, the additional diene elastomeric polymers (D) suitable for the purposes of the present invention are selected from at least one additional styrene-butadiene polymer (SBR), at least one polybutadiene polymer (BR), at least one polyisoprene polymer (IR) and at least one elastomeric polymer of one or more monoolefins with an olefin comonomer or derivatives thereof (a').

At least one additional styrene-butadiene elastomeric polymer (SBR) refers to a polymer or copolymer derived from the polymerisation, in solution (S-SBR) or in emulsion (E-SBR) or in the gaseous phase, of one or more conjugated diene monomers with at least one α-olefin monomer, and optionally polar comonomers.

Preferred conjugated diene monomers and α-olefin monomers are those indicated above in the disclosure of the polymer blend.

Preferably, the polar comonomers are selected from among vinylpyradine, vinylquinoline, esters of acrylic acid and alkyl acrylic acid, nitriles, or mixtures thereof, such as methyl acrylate, ethyl acrylate, methyl methacrylate, ethyl methacrylate, acrylonitrile or mixtures thereof.

Examples of SBR solid elastomeric polymers are the copolymers of styrene/1,3-butadiene (SBR), styrene/isoprene/1,3-butadiene, styrene/1,3-butadiene/acrylonitrile.

Examples of SBR solid elastomeric polymers are SBR Sprintan SLR 4630 (Trinseo), SSBR 2560 TDAE (Sibur), SOL R 72612 (Versalis).

At least one polybutadiene elastomeric polymer (BR) refers to a polymer derived from the polymerisation of 1,3-butadiene, optionally in the presence of other conjugated diene monomers as described above, wherein the 1,3-dibutadiene is present in a quantity not less than 50% by weight based on the total weight of the monomers.

Examples of polybutadienes commonly used in the field are 1,4-cis polybutadienes having a high content of double bonds, polybutadiene having a high content of vinyl units, metallocene polybutadiene, copolymers of 1,3-butadiene/acrylonitrile.

Examples of BR polybutadienes are the polybutadiene (Europrene Neocis® BR40)—(Versalis), SKD NHEODIMIO (Nizhnekamsneftechim Export), BUNA CB 29 MES (Lanxess).

At least one polyisoprene polymer (IR) refers to a polymer derived from the polymerisation of isoprene, optionally in the presence of other conjugated diene monomers as described above, wherein the isoprene monomer is present in a quantity not less than 50% by weight based on the total weight of the monomers.

Preferably, the polyisoprene polymer (IR) is a cis-1,4-polyisoprene (natural or synthetic), a 3,4-polyisoprene, a optionally halogenated isoprene/isobutene copolymer, or mixtures thereof, more preferably a natural rubber (NR).

Examples of natural rubber (NR) are SIR 20, SIR 10, STR 20, SMR-2, SKI 3—GROUP II (Sibur), SKI—GROUP II (Nizhnekamsneftechim Export).

In the at least one elastomeric polymer (a') mentioned above, the monoolefins may be selected from among: ethylene and α-olefins generally containing from 3 to 12 carbon atoms, such has propylene, 1-butene, 1-pentene, 1-hexene, 1-octene or mixtures thereof.

The following are preferred: copolymers between ethylene and an α-olefin, optionally with a diene; homopolymers of isobutene or copolymers thereof with small quantities of a diene, which are optionally halogenated at least in part.

The diene which is optionally present generally contains from 4 to 20 carbon atoms and is preferably selected from among: 1,3-butadiene, isoprene, 1,4-hexadiene, 1,4-cyclohexadiene, 5-ethyldiene-2-norbornene, 5-methylene-2-norbornene, vinylnorbornene or mixtures thereof.

Among these, the following are particularly preferred: copolymers of ethylene/propylene (EPR) or copolymers of ethylene/propylene/diene (EPDM); polyisobutene; butyl rubbers, halobutyl rubbers, in particular chlorobutyl or bromobutyl rubbers; or mixtures thereof.

The additional diene elastomeric polymers (D) may optionally be functionalised by reaction with suitable terminating agents or coupling agents (diene elastomeric polymers a'). In particular, the diene elastomeric polymers obtained by anionic polymerisation in the presence of an organometallic initiator (in particular an organolithium initiator) may be functionalised by reacting the residual organometallic groups derived from the initiator with suitable terminating agents or coupling agents such as imines, carbodiimides, alkyl tin halides, substituted benzophenones, alkoxysilanes or aryloxysilanes.

Preferably, the crosslinkable elastomeric composition used to prepare the tire component of the tire of the invention comprises:
    from 20 to 80 phr of the polymer blend described above;
    from 0 to 40 phr of at least one additional styrene-butadiene elastomeric polymer (SBR);
    from 0 to 50 phr of at least one polybutadiene polymer (BR), and
    from 0 to 60 phr of at least one polyisoprene polymer (IR), preferably a natural rubber (NR);
provided that the elastomeric polymer base is 100 phr overall and includes at least one polymer among a polybutadiene polymer (BR) and a polyisoprene polymer (IR).

Preferably, the crosslinkable elastomeric composition for used to prepare the tire component of the tire of the invention comprises at least 1 phr of at least one reinforcement filler (E).

Preferably, the crosslinkable composition comprises at least 20 phr or at least 30 phr or at least 40 phr or at least 50 phr of at least one reinforcement filler (E).

Preferably, the composition comprises not more than 150 phr or more than 140 phr or more than 130 phr or more than 120 phr or more than 110 phr or more than 100 phr of at least one reinforcement filler (E).

Preferably, the composition comprises from 10 to 150 phr or from 30 to 120 phr or from 50 to 120 phr or from 70 to 110 phr or from 80 to 100 phr of at least one reinforcement filler (E).

Preferably, the reinforcement filler (E) is selected from among carbon black, a white filler, or mixtures thereof.

Preferably, said reinforcement filler (E) is a white load selected from among hydroxides, oxides and hydrated oxides, salts and hydrated salts of metals, silicate fibres, or mixtures thereof.

Preferably, said filler is silica-based.

The silica present in the precursor to the composition may interact, during mixing, with the silane coupling agent, added to make the silica compatible and dispersible in the elastomeric polymer.

Preferably, said reinforcement filler (E) is carbon black.

Preferably, said carbon black reinforcement filler is present in the elastomeric composition in a quantity comprised between 1 phr and 120 phr, preferably between approximately 40 phr and approximately 110 phr.

Preferably, the carbon black reinforcement filler is selected from among those having a surface area not less than 20 m²/g, preferably greater than 50 m²/g (determined by STSA—statistical thickness surface area in accordance with ISO 18852:2005).

An example of carbon black is N234, marketed by Birla Group (India) or by Cabot Corporation.

Preferably, said reinforcement filler (E) comprises more fillers, more preferably silica and carbon black.

Preferably, at least 60% by weight, at least 70% by weight, at least 80% by weight or at least 90% by weight of the overall reinforcement filler is silica.

Preferably, the crosslinkable elastomeric composition used to prepare the tire component of the tire of the invention comprises at least 0.05 phr of at least one vulcanising agent (F).

Preferably, the crosslinkable composition comprises at least 0.1 phr, at least 1 phr, at least 2 phr, at least 3 phr, at least 4 phr of at least one vulcanising agent (F).

Preferably, the crosslinkable composition comprises not more than 15 phr, more than 10 phr, more than 8 phr of at least one vulcanising agent (F).

Preferably, the crosslinkable composition comprises from 0.05 to 15 phr or from 0.1 to 10 phr or from 0.2 to 10 phr or from 1 to 10 phr or from 2 to 10 phr of at least one vulcanising agent (F).

Preferably, the vulcanising agent (F) is selected from among sulphur and sulphur-containing molecules which act as sulphur donors.

The sulphur or derivatives thereof may advantageously be selected, for example, from:
i. soluble sulphur (crystalline sulphur);
ii. insoluble sulphur (polymeric sulphur);
iii. sulphur dispersed in a styrene-butadiene polymer (for example 70% sulphur known by the trade name Multisperse S-IS70P from Omya);
iv. sulphur donors such as caprolactame disulphide (CLD), bis(trialkoxyxylyl)propyl)polysulphides, dithiophosphates; or mixtures thereof.

The vulcanising agent (F) is preferably used together with adjuvants as vulcanisation activating agents, accelerators and/or retardants known to persons skilled in the art.

Vulcanisation activating agents which are particularly effective are the zinc compounds. In particular, ZnO, ZnCO₃, zinc salts of saturated or unsaturated fatty acids containing from 8 to 18 carbon atoms are preferably used.

For example, zinc stearate is used, preferably formed in situ, in the elastomeric composition, from ZnO and fatty acid, and, preferably, also magnesium stearate, formed from MgO, or mixtures thereof.

Said vulcanisation activating agents are preferably used in the elastomeric composition in a quantity from approximately 0.5 phr to approximately 10 phr. More preferably, said vulcanisation activating agents are used in the elastomeric composition in a quantity from approximately 1 phr to 5 phr. Even more preferably, said vulcanisation activating agents are used in the elastomeric composition in a quantity of approximately 1.5 phr to 3.5 phr.

An example of an activating agent is the product Aktiplast ST marketed by Rheinchemie.

Preferably, the crosslinkable elastomeric composition may further comprise at least one vulcanisation accelerator.

Vulcanisation accelerators which are commonly used may be selected from among, for example, dithiocarbamates, guanidines, thioureas, thiazoles, sulphonamides, sulphenimides, thiourams, amines, xanthates, or mixtures thereof.

An example of a vulcanisation accelerator is the N-cyclohexyl-2-benzothiazyl-sulphenamide Vulkacit® NZ/EG-C marketed by Lanxess.

Said vulcanisation accelerators are preferably used in the elastomeric composition in a quantity of approximately 0.05 phr to approximately 10 phr.

More preferably, said vulcanisation accelerators are used in the elastomeric composition in a quantity of approximately 0.1 phr to approximately 5 phr.

Even more preferably, said vulcanisation accelerators are used in the elastomeric composition in a quantity of approximately 0.5 phr to approximately 3 phr.

The present crosslinkable elastomeric composition may optionally comprise one or more vulcanisation retardants, such as N-cyclohexylthiophthalimide (VULKALENT G,—Lanxess).

Preferably, if present, said retardants are used in a quantity comprised between 0.05 phr and 2 phr.

The crosslinkable elastomeric composition according to the invention may further comprise from 0.1 to 20 phr of a coupling agent (G).

Preferably, said coupling agent (G) is a silane coupling agent selected from among those having at least one hydrolysable silane group, which may be identified, for example, by the following general formula (IA):

$$(R')_3Si-C_nH_{2n}-X \quad (IA)$$

wherein the groups R', identical or different from one another, are selected from among: alkyl, alkoxy or aryloxy groups or halogen atoms, with the proviso that at least one of the groups R' is an alkoxy or aryloxy group; n is a whole number between 1 and 6 inclusive; X is a group selected from among: nitroso, mercapto, amino, epoxide, vinyl, imide, chloro, —(S)mCnH2n-Si—(R')3 and —S—COR', wherein m and n are whole numbers between 1 and 6 inclusive, and the R' groups are defined as above. Among the silane coupling agents, those which are particularly preferred are bis(3-triethoxysilylpropyl) tetrasulphide and bis(3-triethoxysilyl-propyl) disulphide. Said coupling agents may be used as such or in a suitable mixture with an inert filler (for example carbon black) so as to make it easier to incorporate them into the elastomeric composition.

Preferably, said silane coupling agent is present in the crosslinkable elastomeric composition in a quantity comprised between approximately 0.1 phr and approximately 15 phr, preferably between approximately 0.5 phr and approximately 10 phr.

An example of a silane coupling agent is TESPT: bis(3-triethoxysilylpropyl) tetrasulphide Si69 marketed by Evonik.

The crosslinkable elastomeric composition may comprise other commonly used additives, selected on the basis of the specific application for which the composition is intended, for example anti-ageing agents, anti-reversion agents, adhesives, antiozonants, in particular of the p-phenyldiamine type, antioxidants, waxes, fibres (for example Kevlar® pulp), or mixtures thereof.

Preparation of the Composition

The crosslinkable elastomeric composition mentioned above can be prepared by mixing together the basic elastomeric components together with the other additives optionally present, according to the techniques known by a person skilled in the art. The mixing steps can be carried out, for example, using an open mixer of the open kneader type or an internal mixer of the type with tangential rotors (Banbury) or with copenetrating rotors (Intermix), or in continuous mixers of the co-Kneader type (Buss), or of the co-rotating or counter-rotating twin-screw type.

The Tire and Tire Component

In a preferred embodiment, the tire for vehicles of the invention is a winter tire or snow tire.

According to the invention and as mentioned above, the tire for vehicles comprises a tire component comprising a crosslinked elastomeric material obtained by crosslinking the crosslinkable elastomeric composition disclosed above.

In a preferred embodiment, the tire component of the tire according to the invention is selected from tread band, sidewall, mini-sidewall, bead filling, antiabrasive strip, sublayer arranged between a belt structure and the tread band.

Preferably, the tire component is the tread band.

In a preferred embodiment, the tire according to the invention comprises:

a carcass structure comprising at least one carcass ply having opposite side edges connected to respective bead structures comprising at least one annular anchoring element and at least one bead filling;

a belt structure comprising at least one belt layer applied to the carcass structure at a radially external position;

a tread band applied to said belt structure at a radially external position;

wherein said tread band comprises a crosslinkable elastomeric composition, obtained by vulcanising a crosslinkable elastomeric composition as disclosed herein.

In a preferred embodiment, the tire according to the invention may be prepared by a process which comprises:
a) producing a green tire comprising a tread band applied at a radially external position of the tire;
b) subjecting said green tire to moulding and vulcanisation so as to obtain a finished tire;
wherein said green tread band comprises the above-described crosslinkable elastomeric composition.

Preferably, the tire according to the invention is a tire, more preferably a winter tire, for high-performance or ultra-high-performance vehicles (HP, UHP, SUV).

Preferably, the tire according to the invention is a tire, more preferably a winter tire, for motor cars.

In a preferred embodiment, the tire according to the invention may be a tire for heavy vehicles or for motorcycles.

The Applicant has found that, by virtue of the features of the crosslinkable elastomeric composition described herein, it is possible to provide a tire, more preferably a winter tire, which achieves a better balance of the driving performance on snow and wet ground.

BRIEF DESCRIPTION OF THE DRAWING

Additional features and advantages of the invention will be better apparent from the following description of a preferred embodiment of a tire according to the invention, made—for illustrating and non-limiting purposes—with reference to the attached drawing FIG. 1 which schematically shows in partial section a winter tire for vehicle wheels in accordance with the present invention.

DESCRIPTION OF A PREFERRED TYRE ACCORDING TO THE INVENTION

Referring to FIG. 1, "a" denotes an axial direction and "x-x", following an equatorial plane of the tire, denotes a radial direction. For simplicity, FIG. 1 merely shows a portion of the tire, the remaining portion not illustrated being identical and arranged symmetrically with respect to the radial direction "r".

In FIG. 1, reference numeral 100 denotes a tire, preferably a winter tire, for vehicle wheels according to a preferred embodiment of the invention and formed by a plurality of structural elements.

The tire 100 comprises at least one carcass structure, comprising at least one carcass ply 101 having respectively opposite end flaps attached to respective annular anchoring structures 102, known as bead cores, optionally connected to a bead filling 104.

The region of the tire comprising the bead core 102 and the filling 104 forms an annular reinforcement structure 103, the so-called bead, for anchoring the tire to a corresponding mounting rim, not shown.

The carcass structure is usually radial, in other words, the reinforcement elements of the at least one carcass ply 101 are arranged on planes comprising the rotation axis of the tire and substantially perpendicular to the equatorial plane of the tire.

Said reinforcement elements may be formed by textile strings, for example rayon, nylon, polyester (for example polyethylene naphthalate (PEN)) or by metal strings.

Each annular reinforcement structure is connected to the carcass structure by folding back the opposite lateral edges of the at least one carcass ply 101 around the annular anchoring structure 102 so as to form the so-called folded-back portions of the carcass 101a as shown in FIG. 1.

In one embodiment, the coupling between the carcass structure and the annular reinforcement ring may be provided by way of a second carcass ply (not shown in FIG. 1) applied at an axially external position with respect to the first carcass ply.

Preferably, an antiabrasive strip 105 is arranged at an external position with respect to each annular reinforcement structure 103.

Preferably, each antiabrasive strip 105 is arranged at least at an axially external position on the annular reinforcement structure 103, extending at least between the sidewall 108 and the radially lower portion on the annular reinforcement structure 103.

Preferably, the antiabrasive strip 105 is arranged so as to enclose the annular reinforcement structure 103 along the axially internal, the axially external and the radially inner regions of the reinforcement structure 103 so as to be interposed between said structure and the wheel rim when the tire 100 is mounted thereon.

A belt structure 106, comprising one or more belt layers, for example two layers 106a, 106b placed radially superposed with respect to one another and with respect to the carcass layer, is connected to the carcass structure.

In a preferred embodiment, the belt layers 106a, 106b may comprise reinforcement strings made of metal.

These reinforcement strings may have a crossed orientation with respect to a circumferential direction of progression of the tire 100.

"Circumferential" direction refers herein to a direction generally extending along the rotation direction of the tire.

At a radially external position with respect to the belt layers 106a, 106b, at least one zero-degree reinforcement layer 106c, commonly known as a "0° belt", may be applied.

The zero-degree reinforcement layer 106c generally incorporates a plurality of reinforcement cords, typically textile or metal cords, optionally combined with one another, oriented along a substantially circumferential direction, meaning with this term that the reinforcement cords form an angle of few degrees (for example an angle between approximately 0° and 6°) with respect to the equatorial plane of the tire.

Preferably, the reinforcement cords are coated with an elastomeric material.

A tread band 109 is applied at a radially external position on the belt structure 106.

The tread band 109 comprises a crosslinked elastomeric composition obtained by vulcanising a crosslinkable elastomeric composition as disclosed herein.

At a radially external position, the tread band 109 has a rolling surface 109a intended to come into contact with the ground.

In a preferred embodiment, the tread band 109 comprises a plurality of grooves and blocks, not illustrated for the sake of simplicity, forming a suitable tread pattern intended to impart to the tire 100 the desired traction, road-holding and water draining characteristics.

Respective sidewalls 108 of elastomeric material are further applied at an axially external position on the axially lateral faces of the carcass structure.

More specifically, each sidewall 108 extend from one of the lateral edges of the tread 109 until in line with the respective reinforcement annular structure 103.

A sub-layer 111 is arranged between the belt structure 106 and the tire tread 109.

A strip formed of elastomeric material 110, commonly known as a "mini-sidewall", may optionally be present in the joining region between the sidewalls 108 and the tread band 109, this mini-sidewall generally being obtained by co-extrusion with the tread band 109.

The "mini-sidewall" 110 advantageously allows to improve the mechanical interaction between the tread band 109 and the sidewalls 108. Preferably, the end portion of the sidewall 108 directly covers the lateral edge of the tread band 109.

Typically, a rubber layer 112, generally known as "liner", which provides the necessary impermeability towards the inflation air of the tire, may also be provided at a radially inner position with respect to the carcass ply 101.

The annular tire reinforcement structure 103 may comprises a further protection layer, generally known by the term "chafer" 121 or protection strip, and having the purpose of increasing the rigidity and integrity of the bead structure 103.

The chafer 121 usually comprises a plurality of strings encased in a cross-linked elastomeric material, which are generally made of textile materials (for example aramid or rayon) or of metal materials (for example steel strings).

The rigidity of the tire sidewalls 108 may be improved by providing the annular reinforcement structure 103 with a reinforcement layer 120 generally known as a "flipper" or additional strip-like insert.

The flipper 120 is a reinforcement layer which is wrapped around the respective annular anchoring structure 102 and the bead filling 104 so as to at least partially enclose the same, the flipper 120 being arranged between the at least one carcass layer 101 and the annular reinforcement structure 103.

Preferably, the flipper 120 is in contact with said at least one carcass layer 101 and said annular reinforcement structure 103.

The flipper 120 preferably comprises a plurality of metal or textile strings encased in a cross-linked elastomeric material.

The production of the winter tire 100 as described above may be implemented in a conventional way by assembling respective semi-finished parts suitable for forming the components of the tire on a forming drum, not shown, to be worked on by at least one assembly device.

On the forming drum, at least some of the components intended to form the carcass structure of the tire may be constructed and/or assembled.

More particularly, the forming drum is suitable for initially receiving the optional liner, and subsequently the carcass structure.

Subsequently, conventional devices, not shown, attach one of the annular anchoring structures coaxially around each of the end flaps, position an external sleeve comprising the belt structure and the tread band at a position coaxially centred about the cylindrical carcass sleeve, and shape the carcass sleeve in a toroidal configuration by radially expanding the carcass structure, so as to connect the latter to a radially inner face of the external sleeve.

After the production of the green tire, a moulding and vulcanisation treatment is carried out to provide structural stabilisation of the tire by cross-linking the elastomeric compositions, in addition to forming a desired tread design on the tread band and forming optional distinctive graphical symbols at the sidewalls.

EXAMPLES

The following examples are provided in order to further illustrate the invention and are not to be construed as limitation of the present invention. "Room temperature" refers to a temperature of about 20° C. All polymerizations were performed in a nitrogen atmosphere under exclusion of moisture and oxygen.

Test Methods

Size Exclusion Chromatography

Molecular weight and molecular weight distribution of the polymer were each measured using size exclusion chromatography (SEC) based on polystyrene standards. Each polymer sample (9 to 11 mg) was dissolved in tetrahydrofuran (10 mL) to form a solution.

The solution was filtered using a 0.45-μm filter. A 100 μL sample was fed into a GPC column (Hewlett Packard system 1100 with 3 PL gel 10 μm MIXED-B columns).

Refraction Index-detection was used as the detector for analyzing the molecular weight.

The molecular weight was calculated as polystyrene based on the calibration with EasiCal PS1 (Easy A and B) Polystyrene standards from Polymer Laboratories.

Figures of weight-average molecular weight ($M_w$) are given based on the polystyrene standards.

Analysis to Measure Monomer Conversion

Monomer conversion was determined by measuring the solids concentration (TSC) of the polymer solution at the end of the polymerization.

The maximum solid content is obtained at 100 wt % conversion of the charged butadiene ($m_{Bd}$) and styrene ($m_{St}$) for the final polymer by $TSC_{max}=(m_{Bd}+m_{St})/(m_{Bd}+m_{St}+m_{polar\ agent}+m_{NBL}+m_{cyclohexane})*100\%$.

A sample of polymer solution ranging from about 1 g to about 10 g, depending on the expected monomer conversion, was drawn from the reactor directly into a 200 mL Erlenmeyer flask filled with ethanol (50 mL).

The weight of the filled Erlenmeyer flask was determined before sampling ("A") and after sampling ("B"). The precipitated polymer was removed from the ethanol by filtration on a weighted paper filter (Micro-glass fiber paper, Ø90 mm, MUNKTELL, weight "C"), dried at 140° C., using a moisture analyzer HR73 (Mettler-Toledo) until a mass loss of less than 1 mg within 140 seconds was achieved.

Finally, a second drying period was performed using switch-off at a mass loss of less than 1 mg within 90 seconds to obtain the final mass "D" of the dry sample on the paper filter.

The polymer content in the sample was calculated as $TSC=(D-C)/(B-A)*100\%$. The final monomer conversion was calculated as $TSC/TSC_{max}*100\%$.

Measurement of the Glass (Transition) Temperature Tg

The glass transition temperature was determined using a DSC Q2000 device (TA instruments), as described in ISO 11357-2 (1999) under the following conditions:
Weight: ca. 10-12 mg;
Sample container: standard alumina pans;
Temperature range: (−140 to 80)° C.;
Heating rate: 20 K/min;
Cooling rate: free cooling;
Purge gas: 20 ml Ar/min;
Cooling agent: liquid nitrogen;
Evaluation method: inflection method.

Each sample was measured at least once. The measurements contained two heating runs. The 2nd heating run was used to determine the glass transition temperature.

$^1$H-NMR

Vinyl and total styrene contents were measured using $^1$H-NMR, following ISO 21561-2005, using a NMR spectrometer BRUKER Avance (400 MHz), and a 5-mm dual probe. $CDCl_3$/TMS was used as solvent in a weight ratio of 0.05%:99.95%.

The styrene sequences (styrene oligomers) longer than 6 styrene units based on the total styrene units (also referred to as the fraction of the block styrene (BS) in %) was estimated as recommended by Tanaka et al. in Rubber Chem. and Techn. (1981), 54 (4), 685-91, i.e. the fraction of styrene sequences longer than 6 units was determined using the relative intensity of the ortho-phenyl proton signals resonated higher than 6.7 ppm. This is based on the finding that the ortho-phenyl proton, methine proton, and methylene proton signals shift to a higher magnetic field with increasing degree of polymerization. Thus, a block styrene is defined as a styrene sequence longer than 6 units.

Properties of the Cross-Linkable Compositions

The (raw) cross-linkable elastomeric compositions of the examples disclosed herein were subjected to the following evaluations:

Mooney viscosity ML (1+4) at 100° C. was measured, in accordance with standard ISO 289-1:2005.

Scorching time was measured at 127° C. in accordance with standard ISO 289-2:1994.

MDR rheometric analysis (in accordance with standard ISO 6502) using an MDR2000 Alpha Technologies rheometer, the tests were carried out at 170° C. for 20 minutes at an oscillation frequency of 1.66 Hz (100 oscillations per minute) and an oscillation amplitude of ±0.5°, measuring the time required to bring about an increase of two rheometric units (TS2) and the time required to reach 30% (T30) and 90% (T90) respectively of the final torque (Mf). The maximum torque MH and the minimum torque ML are also measured.

Properties of the Cross-Linked Compositions

After cross-linking (vulcanisation), the elastomeric compositions of the examples disclosed herein were subjected to the following evaluations:

The static mechanical properties were measured at 23° C. in accordance with standard ISO 37:2005.

In particular, the tensile stress at various elongation levels (50%, 100% and 300%, referred to in order as T 50%, T 100%, T 300%), the stress at break) TSb and the elongation at break Eb were measured on samples of the aforementioned elastomeric compositions, vulcanised at 170° C. for 10 minutes.

The tension tests were carried out on ring-type samples having a straight axis.

The hardness in IRHD (23° C.) was measured in accordance with standard ISO 48:2007, on samples of the aforementioned elastomeric materials vulcanised at 170° C. for 10 minutes.

The dynamic mechanical properties were measured using a dynamic Instron device in compression-tension operation by the following methods.

A sample of the raw elastomeric compositions of the examples disclosed herein, vulcanised at 170° C. for 10 minutes, having a cylindrical shape (length=25 mm; diameter=14 mm), pre-load compression up to 25% longitudinal deformation with respect to the initial length and kept at the preset temperature (of −10° C., 0° C., 23° C. or 70° C.) throughout the test, was subjected to a sinusoidal dynamic tension having an amplitude of 3.5% with respect to the pre-load length, at a frequency of 10 Hz.

The dynamic mechanical properties are expressed in terms of dynamic modulus of elasticity values (E') and of tan delta or tan d (dissipation factor). The value of tan delta was calculated as the ratio between the modulus of viscosity (E") and modulus of elasticity (E').

Experimental Part

Unless stated otherwise, in the present experimental part the components of the composition are expressed in phr (parts per hundred of rubber).

Comparative High Molecular Weight (HMW) Polymer A

In the examples which follow a comparative high molecular weight elastomeric polymer A coupled with TMS was used.

This polymer is characterized by the following properties:

| | HMW Polymer | | | | |
|---|---|---|---|---|---|
| Unit | Mw (g/mol) | CR (%) | Styrene cont. (%) | Vinyl cont. (%) | TDAE (phr) |
| Polymer A* | 883,000 | 52 | 25 | 62 | 37.5 |

*SSBR commercial grade SLR 4630 (Trinseo GmbH).

High Molecular Weight Elastomeric Polymer B (Random, Non-Oil-Extended, Coupled with $SiCl_4$, Coupling Rate 50.2%)

A first high molecular weight elastomeric polymer B (random, non-oil-extended, coupled with $SiCl_4$ coupling rate 50.2% by weight) was prepared as follows.

19.597 kg of cyclohexane, 2040 g of butadiene, 693 g of styrene and 2.99 g of DTHFP were charged in a 40 liter reactor. The impurities in the system were titrated by stepwise addition of n-butyl lithium, the addition of butyl lithium was stopped when the yellow color of the polymer solution as recognized. The reaction mixture was heated up to 40° C. (start temperature).

2.7 g of initiator n-butyl lithium in cyclohexane solution (concentration 3.1 mmol/g) were charged into the reactor to start the polymerization. The temperature increased from 40° C. to 75° C. in 25 minutes. The polymerization mixture was allowed to react for 90 minutes. After this time, 2.67 g of silicon tetrachloride (SiCl$_4$) in cyclohexane solution were added (0.5942 mmol/g).

37 g of methanol were then added to stop the reaction. The polymer solution was stabilized with 6.8 g of Irganox 1520 (0.25 phr).

A polymer was obtained having the following characteristics:

Mw=889,000 g/mol (as determined by means of GPC with a polystyrene calibration), coupling rate=50.2% by weight.

The polymer microstructure (as determined with 1H-NMR) and glass transition temperature of the polymer obtained were:

Styrene content=25%,
Vinyl content=62%,
Block Styrene Content=0%,
Tg=−22.6° C.

High Molecular Weight Elastomeric Polymer C (Random, Coupled with TMS, Coupling Rate 42.1%)

A second high molecular weight elastomeric polymer C (random, coupled with TMS and modified with NMP) was prepared as follows.

19.597 kg of cyclohexane, 1999 g of butadiene, 693 g of styrene and 2.99 g of DTHFP were charged in a 40 liter reactor. The impurities in the system were titrated by stepwise addition of n-butyl lithium, the addition of butyl lithium was stopped when the yellow color of the polymer solution was recognized. The reaction mixture was heated up to 40° C. (start temperature).

24.01 g of initiator Li—(CH$_2$)(Me)$_2$Si—N—(C$_4$H$_9$)$_2$ in cyclohexane solution (concentration 0.3329 mmol/g) were charged to the reactor to start the polymerization. The temperature increased from 40° C. to 75° C. in 25 minutes.

The polymerization mixture was allowed to react for 90 minutes.

After this time, 1.5 g of tetramethoxysilane (TMS) in cyclohexane solution was added (0.7659 mmol/g).

After 30 min, 40.8 g of butadiene were added and shortly after 0.9286 g of NMP solution in cyclohexane (concentration: 8.25 mmol/g).

After a reaction time of 30 minutes, 37 g of methanol were added to stop the reaction. The polymer solution was stabilized with 3.45 g of stearylamine (0.13 phr) and 6.8 g of Irganox 1520 (0.25 phr).

A polymer was obtained having the following characteristics:

Mw=984,000 g/mol (as determined by means of GPC with a polystyrene calibration), coupling rate=42.1% by weight.

The polymer microstructure (as determined with 1H-NMR) and glass transition temperature of the polymer obtained were:

Styrene content=24.9%,
Vinyl content=61.4%,
Block Styrene Content=0%,
Tg=−22.6° C.

Low molecular weight elastomeric Dolymer D (random, coupled with TMS)

A first low molecular weight elastomeric polymer D (random, coupled with TMS) was prepared as follows.

20,555 g cyclohexane, 12.893 g of TMEDA and 31.11 g of butyl lithium solution in cyclohexane (3.1533 mmol/g) were charged in a 10 l reactor and heated up to a start polymerization temperature of 42° C. 327 g of butadiene and 106.4 g of styrene (corresponding to a target molecular weight of 4.0 kg/mol) were charged in the reactor during 30 minutes.

The temperature of the polymerization mixture was kept constant at 42° C. The polymerization mixture was allowed to react for additional 30 minutes. After this time, 175.6 g of TMS solution in cyclohexane (0.1626 mmol/g) was added.

After 60 minutes reaction time, 7 g of methanol were added. The polymer solution was stabilized with 0.88 g of Irganox 1520.

The molecular weight was determined by means of GPC with a polystyrene calibration and a Mw of 16,910 g/mol was obtained.

The following polymer microstructure was determined with $^1$H-NMR: Styrene content: 28.3%, Vinyl content: 63.6%.

The coupling rate of the polymer was 61.4% by weight.

Low Molecular Weight Elastomeric Polymer E (Random, Coupled with TMS)

A second low molecular weight elastomeric polymer E (random, coupled with TMS) was prepared as follows.

20,212 g of cyclohexane, 1,517 g of butadiene and 506.6 g of styrene and 33.4 g of DTHFP were charged in a 10 l reactor and heated up to a start polymerization temperature of 42° C.

178.2 g of butyl lithium solution in cyclohexane (conc. 3.1533 mmol/g) was added to start the polymerization reaction. After 60 minutes, 21.4 g of TMS were added to the reaction mixture. The temperature of the polymer mixture was kept constant at 42° C. After 40 minutes reaction time 36.01 g of methanol were added. The polymer solution was stabilized with 4.05 g of Irganox 1520.

The molecular weight was determined by means of GPC with a polystyrene calibration and a Mw of 17,030 g/mol was obtained.

The following polymer microstructure was determined with 1H-NMR: Styrene content: 25.2%, Vinyl content: 62.9%.

The coupling rate of the polymer was 83% by weight.

Comparative Low Molecular Weight Elastomeric Polymer F (Random, Coupled with TMS)

The comparative low molecular weight elastomeric polymer F (random, coupled with TMS) was prepared by following the preparation procedure of the aforementioned low molecular weight elastomeric polymer E adapting as required the amount of the reagents and of the process conditions.

The molecular weight was determined by means of GPC with a polystyrene calibration and a Mw of 86,000 g/mol was obtained.

The following polymer microstructure was determined with $^1$H-NMR: Styrene content: 26.3%, Vinyl content: 68.3%.

The coupling rate of the polymer was 87% by weight.

Preparation of an Exemplary Polymer Blend According to the Invention and of a Comparative Polymer Blend An exemplary polymer blend according to the present invention was prepared using the polymer solutions, as described above.

Specifically, the corresponding polymer solutions of the first high molecular weight elastomeric polymer B and of the low molecular weight elastomeric polymer E were mixed to obtain a polymer blend.

The polymer was then recovered from the solution via steam stripping at 100° C., milled to small crumbs and dried in an oven with air circulation at 70° C. for 30 min.

Finally, the polymer crumbs were dried under ambient conditions on air until a content of residual volatiles was reached below 0.75%.

A comparative blend was prepared following the procedure illustrated above by mixing a polymer solution of the high molecular weight elastomeric polymer B (coupled with TMS) and a solution of the comparative low molecular weight elastomeric polymer F having a Mw higher than the maximum value of 40,000 g/mol.

Details of the inventive and comparative blends are given in Table 1 hereinbelow.

TABLE 1

| Polymer blends P1, P2 | |
| --- | --- |
| Blend P1 according to the invention | |
| High Mw polymer B (%) | Low Mw polymer E (%) |
| 80 | 20 |
| Comparative blend P2 | |
| High Mw polymer B (%) | Low Mw polymer F (%) |
| 85 | 15 |

Polymer Compositions (Examples 1-4)

Polymer compositions were prepared using two comparative high molecular weight polymers without any low molecular weight portion, i.e. polymer A (S-SBR, SLR 4630) and BUNA 5025-0 HM (examples 1-2), the inventive polymer blend P1 (example 3) and the comparative polymer blend P2 (example 4).

The polymer compositions were compounded by kneading according to the formulations shown in the following Table 2 (all amounts in phr) in a standard two-step compound recipe with silica and carbon black as fillers in an internal lab mixer comprising a Banbury rotor type with a total chamber volume of 1100 cm³.

The first mixing step was performed with a filling degree of 73% using an initial temperature of 40° C.

After adding the polymer composition, the filler and all other ingredients described in the formulations for step 1, the rotor speed of the internal mixer is controlled to reach a temperature range between 145° C.-160° C. for up to 4 minutes, so that the silanization reaction can occur.

The total mixing time for the first step is 2'30". After dumping the compound, the mixture is cooled down and stored for relaxing before adding the curing system in the second mixing step.

The second mixing step was done in the same equipment by using a fill factor of 73% at an initial temperature of 50° C. The compound from first mixing step, sulphur as vulcanizing agent and the accelerators MTBS and CBS were added and mixed for a total time of 2'15".

TABLE 2

| | Ex. 1 Comp. | Ex. 2 Comp. | Ex. 3 Inv. | EX. 4 Comp. |
| --- | --- | --- | --- | --- |
| Polymer A | 68.75 | — | — | — |
| Dry Blend P1 | — | — | 50.00 | — |
| Dry Blend P2 | — | — | — | 50.00 |
| Dry SSBR | — | 50 | — | — |
| Dry BR | 22 | 22 | 22 | 22 |
| NR | 28 | 28 | 28 | 28 |
| TDAE oil | 40 | 58.75 | 58.75 | 58.75 |

TABLE 2-continued

| | Ex. 1 Comp. | Ex. 2 Comp. | Ex. 3 Inv. | EX. 4 Comp. |
| --- | --- | --- | --- | --- |
| Carbon black | 8 | 8 | 8 | 8 |
| Silica | 95 | 95 | 95 | 95 |
| Silane TESPT | 6.7 | 6.7 | 6.7 | 6.7 |
| Wax | 2 | 2 | 2 | 2 |
| Stearic acid | 3 | 3 | 3 | 3 |
| Zinc oxide | 2.5 | 2.5 | 2.5 | 2.5 |
| 6-PPD | 3 | 3 | 3 | 3 |
| MBTS | 1.5 | 1.5 | 1.5 | 1.5 |
| CBS | 3 | 3 | 3 | 3 |
| Sulphur | 1.5 | 1.5 | 1.5 | 1.5 |
| Total Dry polymer | 100 | 100 | 100 | 100 |
| Total oil | 58.75 | 58.75 | 58.75 | 58.75 | wherein:

Polymer A: Oil-extended S-SBR Sprintan 4630 (Trinseo GmbH);

Dry SSBR: BUNA 5025-0 HM;

Dry BR: polybutadiene Europrene Neocis® BR40 (Versalis S.p.A.);

NR: natural rubber SMR GP (Malaysia);

TDAE Treated Distillate Aromatic Extract oil: Vivatec 500 (Hansen & Rosenthal KG);

Carbon black: N234 (Birla Group);

Silica: Ultrasil 7000 GR (Evonik Industries AG);

Silane TESPT: bis(3-triethoxysilylpropyl)tetrasulphide—Si69 (Evonik Industries AG);

Wax: Riowax bm-01 (SER S.p.A.);

Stearic acid: Radiacid 444 (Oleon NV);

Zinc oxide: (Norzinco GmbH);

6-PPD: phenyl-p-phenylenediamine (Santoflex 6PPD (Eastman Chemical Co.) (antiozonant);

MBTS: 2,2' dibenzothiazyl disulphide—Rhenogran MTBS-80 (Rhein Chemie GmbH) (accelerator);

CBS: N-cyclohexyl-2-benzothiazyl-sulphenamide SXCHEM CBS GR (Shandong Sunshine Co. Ltd.) (accelerator);

Sulphur: Multisperse S-IS70P (Omya S.p.A.) (vulcanizing agent).

Results

Table 3 below sets out the results of the static and dynamic mechanical properties for cross-linked samples of the polymer compositions according to Examples 1-4.

TABLE 3

| Parameter/Test | Unit of measure | Ex. 1 Comp. | Ex. 2 Comp. | Ex. 3 Inv. | Ex. 4 Comp. |
| --- | --- | --- | --- | --- | --- |
| T 50% | MPa | 1.09 | 1.16 | 1.01 | 1.11 |
| T 100% | MPa | 1.72 | 1.75 | 1.54 | 1.90 |
| T 300% | MPa | 6.62 | 6.40 | 5.79 | 8.00 |
| CR | MPa | 13.77 | 13.96 | 13.77 | 15.30 |
| AR | % | 559 | 589 | 622 | 495 |
| IRHD at 23° C. | IRHD | 68.8 | 77.0 | 72.3 | 84 |
| Mooney ML (1 + 4) at 100° C. | MU | 66.5 | 59.8 | 49.4 | 41.5 |
| E' 10 Hz −10° C. | MPa | 9.43 | 10.80 | 9.64 | 13.49 |
| Tan d 10 Hz −10° C. | | 0.417 | 0.437 | 0.432 | 0.498 |
| E' 10 Hz 0° C. | MPa | 8.18 | 9.71 | 8.53 | 11.25 |
| Tan d 10 Hz 0° C. | | 0.312 | 0.361 | 0.349 | 0.409 |
| E' 10 Hz 23° C. | MPa | 6.86 | 7.54 | 6.72 | 9.01 |
| Tan d 10 Hz 23° C. | | 0.201 | 0.235 | 0.226 | 0.232 |
| E' 10 Hz 70° C. | MPa | 5.80 | 5.67 | 5.48 | 7.03 |
| Tan d 10 Hz 70° C. | | 0.125 | 0.159 | 0.146 | 0.133 |

Road Tests

Car winter tyres having a tread band prepared by vulcanising the comparative polymer compositions of Examples 1 and 2 and the polymer composition according to Example 3 (invention) were produced and subjected to road tests.

All of the tyres were of measurement 225/45 R17, with rim 6.0 J and pressure of 2.2 bar for the rear tyres and 2 bar for the front tyres.

Braking tests on a dry and wet road surface and traction and braking tests on a snow-covered road were carried out.

The braking test, both in dry and in wet conditions, takes place using winter tyres equipped on a vehicle provided with a wheel anti-lock braking system (A.B.S).

This braking test was carried out on a straight asphalt passage, in both dry and wet conditions, determining the stopping distance from a preset initial speed, typically 100 km/h in dry conditions and 80 km/h in wet conditions.

The braking test on a snow-covered road was carried out by subjecting the vehicle to deceleration from 50 to 5 km/h using both the anti-lock brake system (A.B.S.) and travel with locked wheels.

The traction test on a snow-covered road was carried out by subjecting the vehicle to acceleration from 0 to 35/40 km/h, wherein accelerometers detect the traction force exerted by the winter tyre on the snow-covered road surface.

The results of the road tests are set out in Table 4, the assessment being reparametrized by setting the assessment for the reference winter tyre (tread composition of Example 1) to 100:

TABLE 4

| Road test | Ex. 1 Comp. | Ex. 2 Comp. | Ex. 3 Inv. |
|---|---|---|---|
| Wet braking | 100 | 100 | 106 |
| Dry braking | 100 | 98 | 101 |
| Snow traction | 100 | 100 | 100 |
| Snow braking | 100 | 100 | 100 |

In table 4, relating to the results of the road tests, an increase of the value from 100 indicates an improvement in the related parameter (for example 106 vs 100 in the wet braking indicates that this winter tyre behaves better—in other words has a lower braking distance on wet ground—than the tyre having a tread according to reference Example 1). Analogously, a reduction in the value (for example from 100 to 98 in the dry braking between the winter tyre of comparative Example 1 and that of comparative Example 2) represents a worsened performance.

As may be inferred from Table 3, the comparative cross-linked polymer composition of Example 4 obtained using a blend including a coupled low molecular weight elastomeric polymer having a molecular weight outside of the claimed range of 5000-40,000 g/mol, shows an increase of Tan d both at −10° C. (+19.4%) and at 0° C. (+31.1%) (considered predictive of an improved wet behaviour and braking of the tire) which is unable to counterbalance the simultaneous substantial increase of the polymer stiffness E' at −10° C. (+43.1%) and at 0° C. (+37.5%) (considered predictive of a worsened wet behaviour and braking of the tire), thereby rendering this comparative cross-linked polymer composition hardly suitable to improve the wet/snow balance of a winter tire.

As may be inferred from Table 3, thanks to the presence in the polymer composition of the invention of a blend including a coupled low molecular weight (second) elastomeric polymer having a molecular weight within the range of 5,000-40,000 g/mol and a coupling rate of at least 50 percent by weight, the cross-linked polymer composition according to the invention (Ex. 3) shows a significant increase of Tan d both at −10° C. (+3.6%) and at 0° C. (+11.9%) (considered predictive of an improved wet behaviour and braking of the tire) which counterbalances and overrides the simultaneous limited increase of the polymer stiffness E' at −10° C. (+2.2%) and at 0° C. (+4.3%) (considered predictive of a worsened wet behaviour and braking of the tire).

The data shown in Table 4 confirm that a winter tire according to the invention has a better performance in terms of wet and dry braking with respect to the reference tires of comparative examples 1 and 2.

On the other hand, such a significant increase of Tan d both at −10° C. and at 0° C. of the winter tire according to the invention also surprisingly allows to counterbalance the simultaneous limited increase of the polymer stiffness E' predictive of a worsened snow traction and braking due to an increased rigidity of the vulcanized polymer composition.

The data shown in Table 4 therefore confirm that a winter tire according to the invention has a substantially equal performance in terms of snow traction and braking with respect to the reference tires of comparative examples 1 and 2.

Overall, the tires according to the invention therefore achieve a better balance of the tire performances on wet and snow ground and, at the same time, a better performance in terms of braking on dry surfaces.

The invention claimed is:

1. A tire for vehicle wheels comprising a tire component comprising a crosslinked elastomeric material obtained by crosslinking a crosslinkable elastomeric composition, wherein the elastomeric composition comprises a polymer blend comprising:
(a) from 50 percent to 95 percent by weight of a first elastomeric polymer; and
(b) from 5 percent to 50 percent by weight of a second elastomeric polymer;
wherein the first elastomeric polymer (a) is obtainable by:
(I) anionic polymerization of at least one conjugated diene monomer and one or more α-olefin monomer(s) in the presence of a polymerization initiator in an organic solvent;
wherein the second elastomeric polymer (b) is obtainable by:
(i) anionic polymerization of at least one conjugated diene monomer and one or more α-olefin monomer(s) in the presence of a polymerization initiator in an organic solvent, and (ii) coupling the polymer chains obtained in (i) by a coupling agent;
wherein the first elastomeric polymer (a) has a weight-average molecular weight (Mw) ranging from 300,000 g/mol to 4,000,000 g/mol;
wherein the second elastomeric polymer (b) has a weight-average molecular weight (Mw) ranging from 5,000 to g/mol 40,000 g/mol;
wherein the at least one conjugated diene monomer of at least one of the first elastomeric polymer and the second elastomeric polymer is chosen from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 3-butyl-1,3-octadiene, 2-methyl-2,4-pentadiene, cyclopentadiene, 2,4-hexadiene, 2-phenyl-1,3-butadiene, 1,3-cyclooctadiene, and mixtures thereof;
wherein the one or more α-olefin monomer of at least one of the first elastomeric polymer and the second elastomeric polymer is chosen from styrene, 1-vinylnaphthalene, 2-vinylnaphthalene, alkyl, cycloalkyl, aryl, alkyl derivative, arylalkyl derivatives of styrene, and mixtures thereof;

wherein the first elastomeric polymer (a) is a styrene-butadiene-copolymer and the second elastomeric polymer (b) is a styrene-butadiene-copolymer;

wherein an α-olefin content of the first elastomeric polymer ranges from 10% to 50% by weight and the vinyl content of the diene fraction of the first elastomeric copolymers range from 10% to 70% by weight;

wherein an α-olefin content of the second elastomeric polymer ranges from 5% to 50% by weight and the vinyl content of the diene fraction of the second elastomeric copolymers ranges from 30% to 75% by weight;

wherein a coupling rate of the second elastomeric polymer (b) is at least 50 percent by weight;

wherein amounts of components (a) and (b) are based on the total weight of the polymer blend; and a degree of branching of the second elastomeric polymer is between 2 and 4.

2. The tire for vehicle wheels according to claim 1, wherein the polymer blend comprises 10 to 50 percent by weight of the second elastomeric polymer (b) based on the total weight of the polymer blend.

3. The tire for vehicle wheels according to claim 1, wherein the second elastomeric polymer (b) has a weight-average molecular weight (Mw) ranging from 8,000 g/mol to 30,000 g/mol.

4. The tire for vehicle wheels according to claim 1, wherein the polymer blend further comprises (c) from 0 percent to 13 percent by weight of one or more extender oil(s).

5. The tire for vehicle wheels according to claim 1, wherein polymer chain ends of the first elastomeric polymer (a) obtainable in (I) are modified by addition and reaction of at least one compound of formula (1), or formula (12), as defined below:

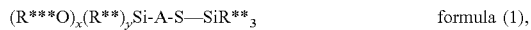
(R*O)$_x$(R)$_y$Si-A-S—SiR$_3$            formula (1), wherein each of R is independently chosen from $C_1$-$C_{16}$ alkyl or alkylaryl; R*** is independently chosen from $C_1$-$C_4$ alkyl; A is chosen from $C_6$-$C_{18}$ aryl, $C_7$-$C_{50}$ alkylaryl, $C_1$-$C_{50}$ alkyl, and $C_2$-$C_{50}$ dialkylether; x is an integer chosen from 1, 2 and 3; y is an integer chosen from 0, 1 and 2; provided that x+y=3;

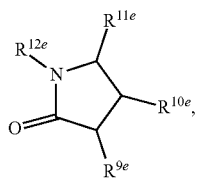
formula (12)

wherein $R^{9e}$, $R^{10e}$, $R^{11e}$ and $R^{12e}$ are each independently chosen from hydrogen, ($C_1$-$C_{16}$) alkyl, ($C_6$-$C_{16}$) aryl and ($C_7$-$C_{16}$) aralkyl.

6. The tire for vehicle wheels according to claim 5, wherein the compound represented by formula (1) is chosen from (MeO)$_3$Si—(CH$_2$)$_3$—S—SiMe$_2$C(Me)$_3$, (MeO)$_2$(Me)Si—(CH$_2$)$_3$—S-SiEt$_3$, (MeO)$_2$(Me)Si—(CH$_2$)$_3$—S—Si(tBu)$_3$, (MeO)$_2$(Me)Si—(CH$_2$)$_3$—S—Si(Bn)$_3$ or (MeO)$_2$(Me)Si—(CH$_2$)$_3$—S—SiMe$_2$C(Me), and mixtures thereof.

7. The tire for vehicle wheels according to claim 5, wherein the compound represented by formula (12) is N-methyl-2-pyrrolidone.

8. The tire for vehicle wheels according to claim 5, wherein R, R*, or A may independently be substituted with one or more groups, chosen from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl.

9. The tire for vehicle wheels according to claim 5, wherein $R^{9e}$, $R^{10e}$, $R^{11e}$ are hydrogen and $R^{12e}$ is methyl.

10. The tire for vehicle wheels according to claim 1, wherein polymer chain ends of the first elastomeric polymer (a) obtainable in (I) are modified by addition and reaction of at least one compound of formula (2), as defined below:

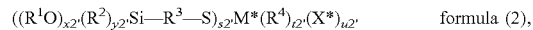
((R$^1$O)$_{x2'}$(R$^2$)$_{y2'}$Si—R$^3$—S)$_{s2'}$M*(R$^4$)$_{t2'}$(X*)$_{u2'}$,   formula (2), wherein M* is silicon or tin; x2' is an integer chosen from 1, 2 and 3; y2' is an integer chosen from 0, 1, and 2; wherein x2'+y2'=3; s2' is an integer chosen from 2, 3 and 4; t2' is an integer chosen from 0, 1 and 2; u2' is an integer chosen from 0, 1 and 2;

wherein s2'+t2'+u2'=4; $R^1$ is independently chosen from hydrogen and ($C_1$-$C_6$) alkyl; $R^2$ is independently chosen from ($C_1$-$C_{16}$) alkyl, ($C_7$-$C_{16}$) alkylaryl and ($C_7$-$C_{16}$) arylalkyl; $R^3$ is at least divalent and is independently chosen from ($C_1$-$C_{16}$) alkyl, ($C_8$-$C_{16}$) alkylarylalkyl, ($C_7$-$C_{16}$) arylalkyl and ($C_7$-$C_{16}$) alkylaryl, and each group may be substituted with one or more of the following groups: tertiary amine group, silyl group, ($C_7$-$C_{18}$) aralkyl group and ($C_6$-$C_{18}$) aryl group;

$R^4$ is independently chosen from ($C_1$-$C_{16}$) alkyl and ($C_7$-$C_{16}$) alkylaryl; X* is independently chosen from chloride, bromide and —OR$^{5*}$; wherein $R^{5*}$ is chosen from ($C_1$-$C_{16}$) alkyl and ($C_7$-$C_{16}$) arylalkyl.

11. The tire for vehicle wheels according to claim 1, wherein the coupling agent is at least one compound of formula (16), formula (II) or formula (III), as defined below:

(R$^{100}$)$_{a100}$(Z**)$_{Xb100}$            formula (16),

(R$^{100}$O)$_{a100}$(Z**)X$_{b100}$            formula (II),

(R$^{100}$O)$_{b100}$(Z)(R$^{100}$)$_{a100}$            formula (III), wherein Z is tin or silicon; X$_{b100}$ is independently chosen from chlorine, bromine and iodine; R$^{100}$ is independently chosen from ($C_1$-$C_{20}$) alkyl, ($C_3$-$C_{20}$) cycloalkyl, ($C_6$-$C_{16}$) aryl and ($C_7$-$C_{16}$) aralkyl; a100 is independently an integer ranging from 0 to 1 and b100 is independently an integer from 3 to 4, provided that a+b=4.

12. The tire for vehicle wheels according to claim 1, wherein the coupling agent is chosen from SiCl$_4$, Si(OCH$_3$)$_4$ and SnCl$_4$.

13. The tire for vehicle wheels according to claim 1, wherein the polymerization initiator used in (i) is chosen from n-BuLi, sec-BuLi, and tert-BuLi.

14. The tire for vehicle wheels according to claim 1, wherein the polymerization initiator used in (I) is chosen from n-BuLi, sec-BuLi, tert-BuLi, Li—(CH$_2$)(Me)$_2$Si—N—(C$_4$H$_9$)$_2$, Li—(CH$_2$)(Me)$_2$Si—N—(C$_2$H$_5$)$_2$, a compound of formula (6) or formula (7), a Lewis base adduct thereof, and a mixture thereof; wherein the compound of formula (6) and formula (7) are:

formula (6)

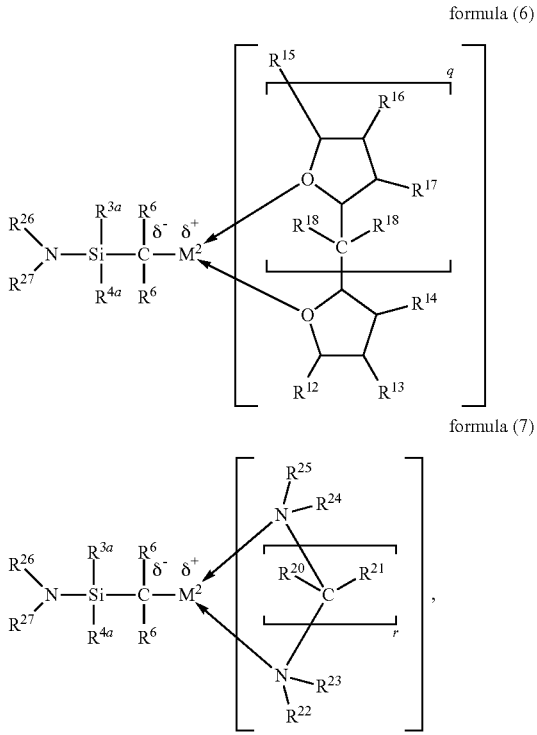

formula (7)

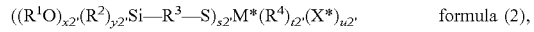

wherein $R^{3a}$ is independently chosen from —N($R^{28}$)$R^{29}$, $C_1$-$C_{18}$ alkyl, $C_6$-$C_{18}$ aryl and ($C_7$-$C_{18}$) aralkyl; $R^4a$ is independently chosen from —N($R^{30a}$)$R^{31a}$, ($C_1$-$C_{18}$) alkyl, ($C_6$-$C_{18}$) aryl and ($C_7$-$C_{18}$) aralkyl; $R^5$ and $R^6$ are each independently chosen from hydrogen, $C_1$-$C_{18}$ alkyl, $C_6$-$C_{18}$ aryl and $C_7$-$C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently chosen from hydrogen, $C_1$-$C_{18}$ alkyl, $C_6$-$C_{18}$ aryl and $C_7$-$C_{18}$ aralkyl; $R^{26}$, $R^{27}$, $R^{28}$, $R^{29}$, $R^{30a}$ and $R^{31a}$ are each independently chosen from $C_1$-$C_{18}$ alkyl, $C_6$-$C_{18}$ aryl and $C_7$-$C_{18}$ aralkyl; q is chosen from an integer of 1, 2, 3, 4 and 5; r is an integer chosen from 1, 2 and 3; and a1' is an integer chosen from 0 or 1.

15. The tire for vehicle wheels according to claim 14, wherein a1' is 1.

16. The tire for vehicle wheels according to claim 1, wherein the first elastomeric polymer (a) and the second elastomeric polymer (b) are random polymers, or the first elastomeric polymer (a) or the second elastomeric polymer (b) is a random polymer.

17. The tire for vehicle wheels according to claim 1, wherein the coupling rate of the second elastomeric polymer (b) is lower than 98% by weight.

18. The tire for vehicle wheels according to claim 1, wherein the crosslinkable elastomeric composition comprises from 20 phr to 80 phr of the polymer blend.

19. The tire for vehicle wheels according to claim 1, wherein the crosslinkable elastomeric composition comprises from 2 phr to 40 phr of the second elastomeric polymer (b).

20. The tire for vehicle wheels according to claim 1, wherein the tire component is chosen from sidewall, mini-sidewall, bead filling, antiabrasive strip, sub-layer arranged between a belt structure, and the tread band.

21. The tire for vehicle wheels according to claim 1, wherein the first elastomeric polymer (a) is obtainable by coupling of the polymer chains obtained in (I) by a coupling agent.

22. The tire for vehicle wheels according to claim 1, wherein the polymer chain ends of the second elastomeric polymer (b) obtained in (i) are modified by addition and reaction of at least one compound of formula (2), as defined below:

$$((R^1O)_{x2'}(R^2)_{y2'}Si—R^3—S)_{s2'}M^*(R^4)_{t2'}(X^*)_{u2'}, \quad \text{formula (2)},$$

wherein M* is silicon or tin; x2' is an integer chosen from 1, 2 and 3; y2' is an integer chosen from 0, 1, and 2;

wherein x2'+y2'=3; s2' is an integer chosen from 2, 3 and 4; t2' is an integer chosen from 0, 1 and 2; u2' is an integer chosen from 0, 1 and 2;

wherein s2'+t2'+u2'=4; $R^1$ is independently chosen from hydrogen and ($C_1$-$C_6$) alkyl; $R^2$ is independently chosen from ($C_1$-$C_{16}$) alkyl, ($C_7$-$C_{16}$) alkylaryl and ($C_7$-$C_{16}$) arylalkyl; $R^3$ is at least divalent and is independently chosen from ($C_1$-$C_{16}$) alkyl, ($C_8$-$C_{16}$) alkylarylalkyl, ($C_7$-$C_{16}$) arylalkyl and ($C_7$-$C_{16}$) alkylaryl, and each group may be substituted with one or more of the following groups: tertiary amine group, silyl group, ($C_7$-$C_{18}$) aralkyl group and ($C_6$-$C_{18}$) aryl group;

$R^4$ is independently chosen from ($C_1$-$C_{16}$) alkyl and ($C_7$-$C_{16}$) alkylaryl; X* is independently chosen from chloride, bromide and —O$R^{5*}$; wherein R5* is chosen from ($C_1$-$C_{16}$) alkyl and ($C_7$-$C_{16}$) arylalkyl.

* * * * *